(12) United States Patent
Hancock et al.

(10) Patent No.: US 7,499,997 B2
(45) Date of Patent: Mar. 3, 2009

(54) METHOD AND SYSTEM FOR INTERFACING WITH A SHIPPING SERVICE

(75) Inventors: Brian D. Hancock, Green Bay, WI (US); Douglas S. Olson, Grand Blanc, MI (US); Robert J. Schommer, DePere, WI (US)

(73) Assignee: Schneider Logistics, Inc., Green Bay, WI (US)

( * ) Notice: Subject to any disclaimer, the term of this patent is extended or adjusted under 35 U.S.C. 154(b) by 153 days.

(21) Appl. No.: 11/637,658

(22) Filed: Dec. 12, 2006

(65) Prior Publication Data

US 2007/0106781 A1    May 10, 2007

Related U.S. Application Data

(62) Division of application No. 10/884,465, filed on Jul. 2, 2004, now Pat. No. 7,366,770, which is a division of application No. 09/768,282, filed on Jan. 25, 2001, now Pat. No. 6,785,718.

(60) Provisional application No. 60/242,069, filed on Oct. 23, 2000.

(51) Int. Cl.
*G06F 13/00* (2006.01)
(52) U.S. Cl. .................... 709/224; 709/219; 719/328
(58) Field of Classification Search ................. 709/217, 709/219, 223, 224; 719/328, 329
See application file for complete search history.

(56) References Cited

U.S. PATENT DOCUMENTS

| | | | |
|---|---|---|---|
| 5,809,479 A | 9/1998 | Martin et al. | |
| 5,893,076 A | 4/1999 | Hafner et al. | |
| 5,910,896 A | 6/1999 | Hahn-Carlson | |
| 6,078,889 A | 6/2000 | Boucher et al. | |
| 6,094,642 A | 7/2000 | Stephenson et al. | |
| 6,115,696 A | 9/2000 | Auger | |
| 6,279,033 B1 * | 8/2001 | Selvarajan et al. | 709/217 |
| 6,553,178 B2 * | 4/2003 | Abecassis | 386/83 |
| 7,234,155 B1 * | 6/2007 | Kay et al. | 725/60 |

OTHER PUBLICATIONS

"Quick Help" information available at <<http://www.fedex.com/us/tracking/quickhelp.html>> and <<http://grd.fedex.com//tracking/mtrchlp.htm>>, undated, four pages.

* cited by examiner

*Primary Examiner*—Viet Vu
(74) *Attorney, Agent, or Firm*—Hunton & Williams LLP

(57) ABSTRACT

A logistics node receives a purchase order from a customer. The logistics node selects an appropriate carrier to transport products specified in the purchase order and conveys shipping instructions to the selected carrier. The logistics node also coordinates the shipment by interacting with a source node (associated with a supplier of the products) and a destination node (associated with the recipient of the products). According to one exemplary feature, the logistics node provides an interface that permits users involved in the distribution chain to track the status of the shipments without having to enter tracking codes that are unique to individual carriers. According to another exemplary feature, the interface allows a user to access multiple "levels" of information regarding a shipment, including information pertaining to an individual product within a shipment containing multiple products. According to another exemplary feature, the interface allows a user to change the priority status associated with particular products that have already been presented for shipment. According to another exemplary feature, the interface provides different "views" for use by different respective users. Each of the views provides a corresponding different set of tools for use in interacting with the freight managing service.

14 Claims, 26 Drawing Sheets

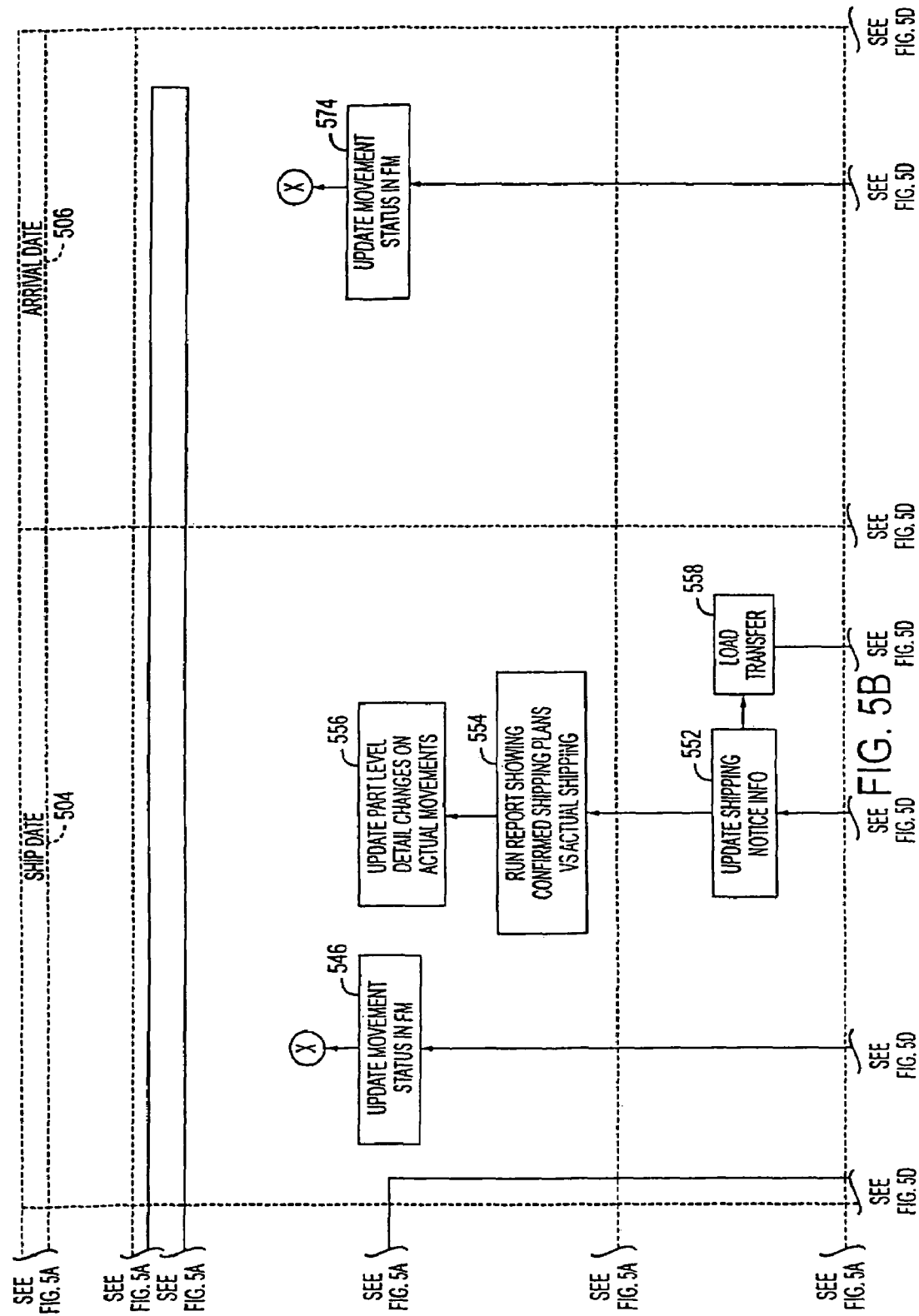

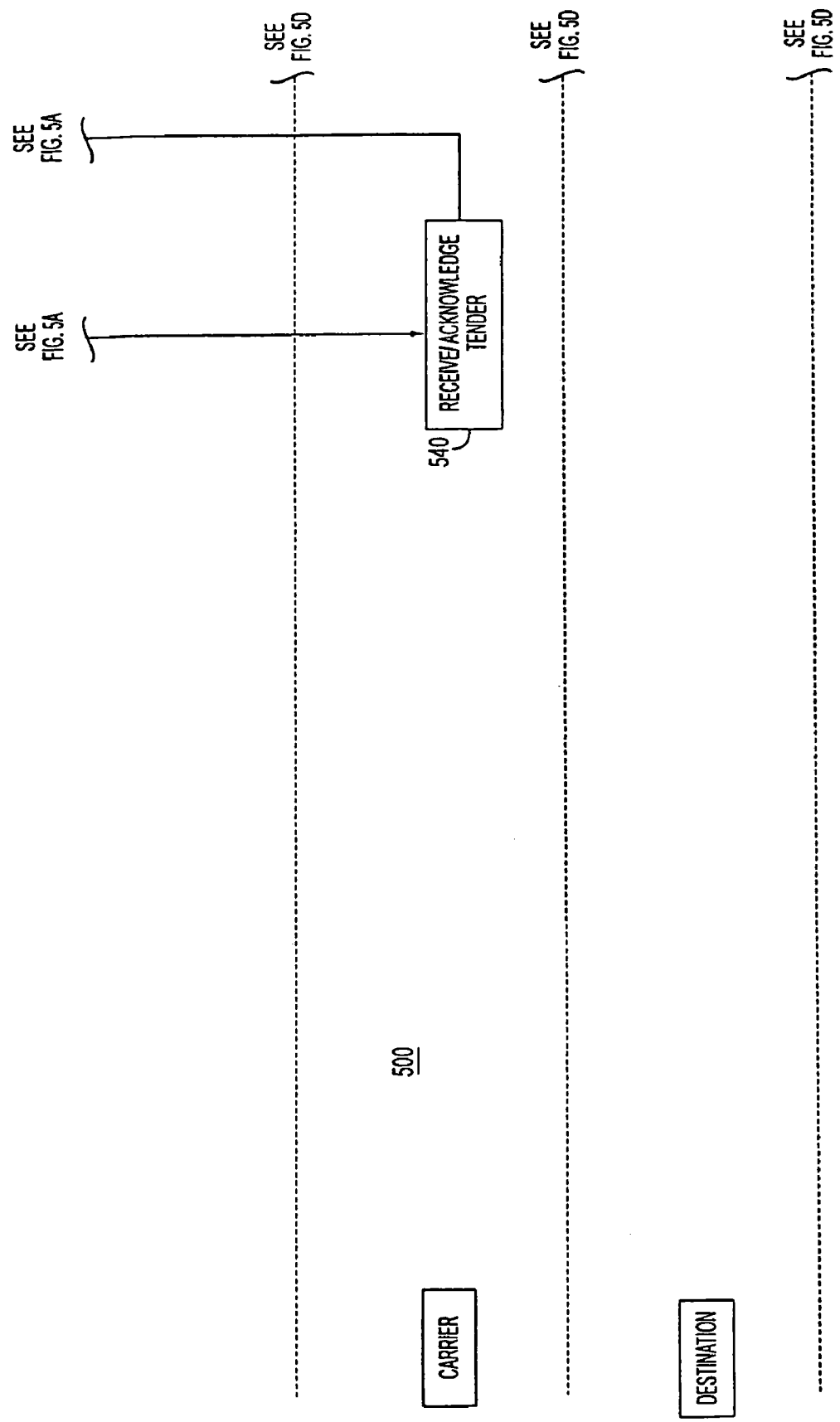

Supplier 1751

Send Shipping Notice

Help Step #1: Update information below if necessary. If you wish to go back to the previous screen without updating, press the BACK button.

SLI#: 9376984　　　Ship To:

Carrier ID: SFVY　　　Transportation Mode: LTL

Carrier Name: SCHNEIDER FREIGHT VELOCIT

Confirm Ship Date: 10/17/00　　　Actual Ship Date: 10/20/00

Master BOL:　　　Trailer/SMPK ID:

Carrier Pro#:

| Part | Description | Priority | Conf. Qty | Ship Qty | BOL# |
|---|---|---|---|---|---|
|  | PANEL ASM |  | 20 | 20 |  |

Step #2: If the shipment plan is correct, specify the "YES" option below and press the SEND SHIPPING NOTICE button. If the shipment is not correct, specify the "NO" option, enter the corrections in the space provided, and press the SEND SHIPPING NOTICE button.

Are the parts loaded as specified in the plan above?　　○ Yes　○ No　(Please specify corrections below)

[Send Shipping Notice] [Back]

FIG. 9E

METHOD AND SYSTEM FOR INTERFACING WITH A SHIPPING SERVICE

This application is a divisional of U.S. patent application Ser. No. 10/884,465 filed on Jul. 2, 2004 now U.S. Pat. No. 7,366,770, which claims benefit of U.S. patent application Ser. No. 09/768,282 filed on Jan. 25, 2001 now U.S. Pat. No. 6,785,718, which claims the benefit of U.S. Provisional Application No. 60/242,069, filed on Oct. 23, 2000, the contents of which are incorporated by reference herein in their entirety.

BACKGROUND OF THE INVENTION

1. Field of the Invention

The present invention generally relates to a method and system for interfacing with a shipping service. More specifically, the present invention relates to a method and system for interfacing with a freight management system that manages the transfer of products from a source site to a destination site.

2. Related Art

Some shipping carriers provide tracking tools that permit customers to track the status of shipments made by the carriers. One known carrier, for instance, provides an Internet-accessible tracking tool that allows a customer to determine whether or not a package shipped by the carrier has reached its intended destination. In operation, the customer queries the tool by inputting a unique package number assigned by the carrier. The tool uses this number as an index to retrieve any status information that may have been entered regarding the package in the course of its delivery.

However, the above-described type of tracking tool has limitations. Namely, a customer can extract information from this tool only if the customer knows the identity of the carrier that is shipping the package and the reference number (or numbers) assigned to the package by the carrier. Tracking packages based on the individual codes assigned by separate carriers may pose a burden on a customer who places multiple orders in the course of a day using several carriers. Further, a package-centric approach to product tracking (that is, where a package identification number is used to track the location of the product) may become ineffective if the products shipped in an initial package are transferred to another package in the course of transit. That is, in this case, a customer may not be able to examine the status of a shipment by inputting the reference number associated with the initial package.

Another drawback of known systems is that they generally provide only rudimentary information regarding the location of a package. However, as appreciated by the present inventors, there may be many aspects regarding the transfer of the products that may interest different customers. For instance, a large package may contain several items. A customer cannot use the above-described Internet tool to investigate the contents of the package. Further, the package may be combined with other packages and shipped on a particular carrier. A customer cannot use the above-described Internet tool to broaden the search by examining the scope and composition of the overall shipment.

Another drawback of known systems is that they provide limited provisions for handling high priority shipments. For instance, if a customer initially places a high priority on a shipment, the customer will typically select a mode of transportation that ensures quick and reliable service (as opposed to slower, more unpredictable services). For instance, for a small package, the customer might opt to ship it by Federal Express, identifying that it is to be delivered to the destination site the next business morning. A problem arises, however, when the user initially sends the product using a low priority service, and then later learns that the product should be delivered as a high priority shipment (e.g., in a quicker time frame than was originally anticipated). The known shipping services do not provide an effective mechanism for allowing a customer to alter the priority of the shipment once the shipment is under way. Indeed, the known systems do not even provide a mechanism for identifying high priority products within, for instance, a shipload of lower priority products. Hence, the high priority products may be lost in a "sea" of lower priority items and cannot be targeted for expedited processing.

There is accordingly a need to provide a more effective interface between a shipping service and its users.

SUMMARY OF THE INVENTION

The present invention addresses the above-identified needs, as well as additional unspecified needs.

One exemplary aspect of the invention pertains to a logistics node for administering the shipment of a product from a source node to a destination node, including: an interface unit for coupling the logistics node with at least one remote entity; a processing unit coupled to the interface unit for controlling the operation of the logistics node; a database coupled to the processing unit for storing information pertaining to the shipment of a product from the source node to the destination node; and tracking logic for receiving an inquiry from a user regarding a shipment being made by at least one of a plurality of possible carrier candidates, and in response thereto, providing information pertaining to the shipment. The inquiry does not require a user to specify carrier-specific information to successfully retrieve information regarding the shipment.

Another exemplary aspect of the invention pertains to a logistics node for administering the shipment of a product from a source node to a destination node, including: an interface unit for coupling the logistics node with at least one remote entity; a processing unit coupled to the interface unit for controlling the operation of the logistics node; a database coupled to the processing unit for storing information pertaining to the shipment of a product from the source node to the destination node; and interface administration logic for permitting a first class of users to interact with the logistics node using a first interface, the first interface providing access to a first set of functions, and for permitting a second class of users to interact with the logistics node using a second interface, the second interface providing access to a second set of functions. The first set of functions differs from the second set of functions, and wherein the first set of users are affiliated with the source node and the second set of users are affiliated the destination node.

Another exemplary aspect of the invention pertains to a logistics node for administering the shipment of a product from a source node to a destination node, including: an interface unit for coupling the logistics node with at least one remote entity; a processing unit coupled to the interface unit for controlling the operation of the logistics node; a database coupled to the processing unit for storing information pertaining to the shipment of a product from the source node to the destination node; logic for providing a user with an option to examine shipment information using first and second levels of detail, wherein the second level of detail is more refined compared to the first level of detail; logic for allowing a user to select the first or second level of detail; and logic for providing shipping information to the user corresponding to the selected level of detail.

Another exemplary aspect of the invention pertains to a logistics node for administering the shipment of a product from a source node to a destination node, including an interface unit for coupling the logistics node with at least one remote entity; a processing unit coupled to the interface unit for controlling the operation of the logistics node; a database coupled to the processing unit for storing information pertaining to the shipment of a product from the source node to the destination node; and logic for permitting at least one user to change a priority level associated with at least one product.

Additional features and advantages of the invention are identified in the ensuring discussion.

BRIEF DESCRIPTION OF THE DRAWINGS

The present invention can be understood more completely by reading the following Detailed Description of exemplary embodiments, in conjunction with the accompanying drawings, in which:

FIGS. 9A-9E show an exemplary series of screens appropriate to a user affiliated with the source node;

DETAILED DESCRIPTION OF THE INVENTION

Figure 2:
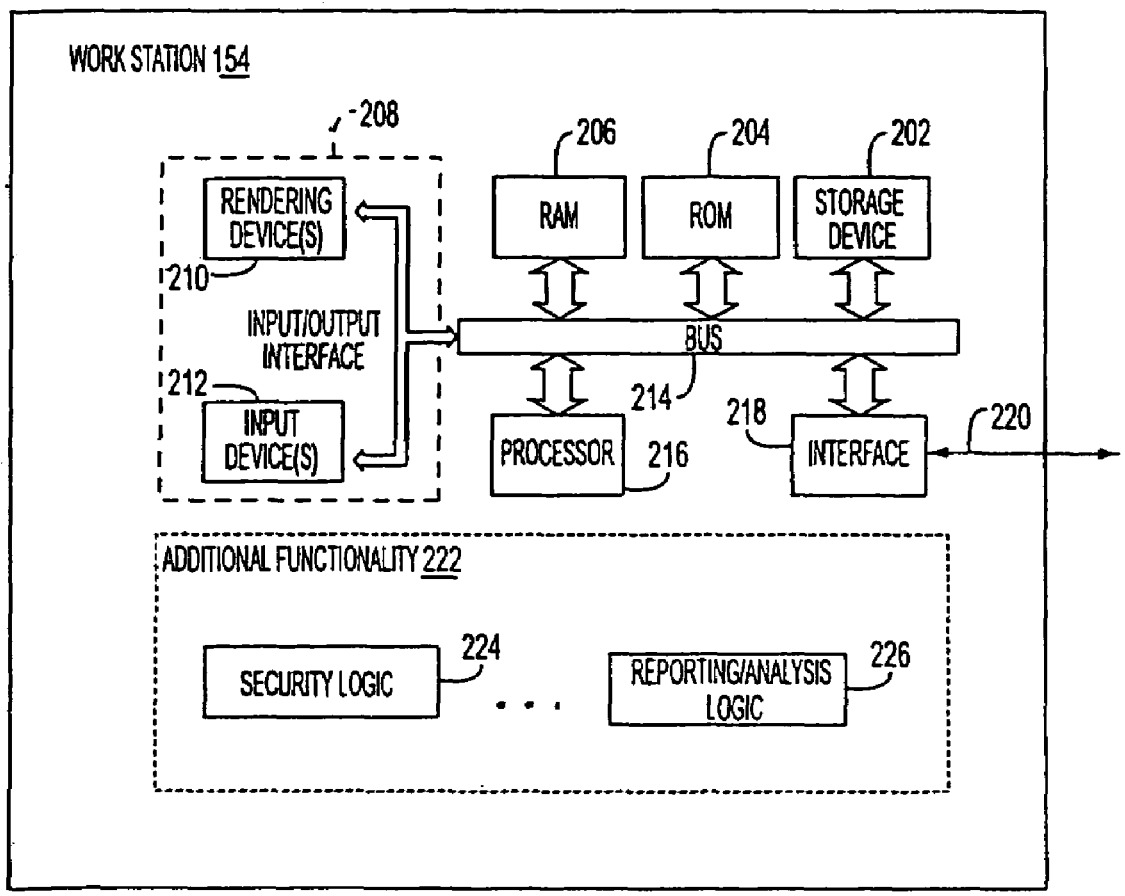
FIG. 2 shows an exemplary work station for interacting with the system of FIG. 1.
Figure 3:
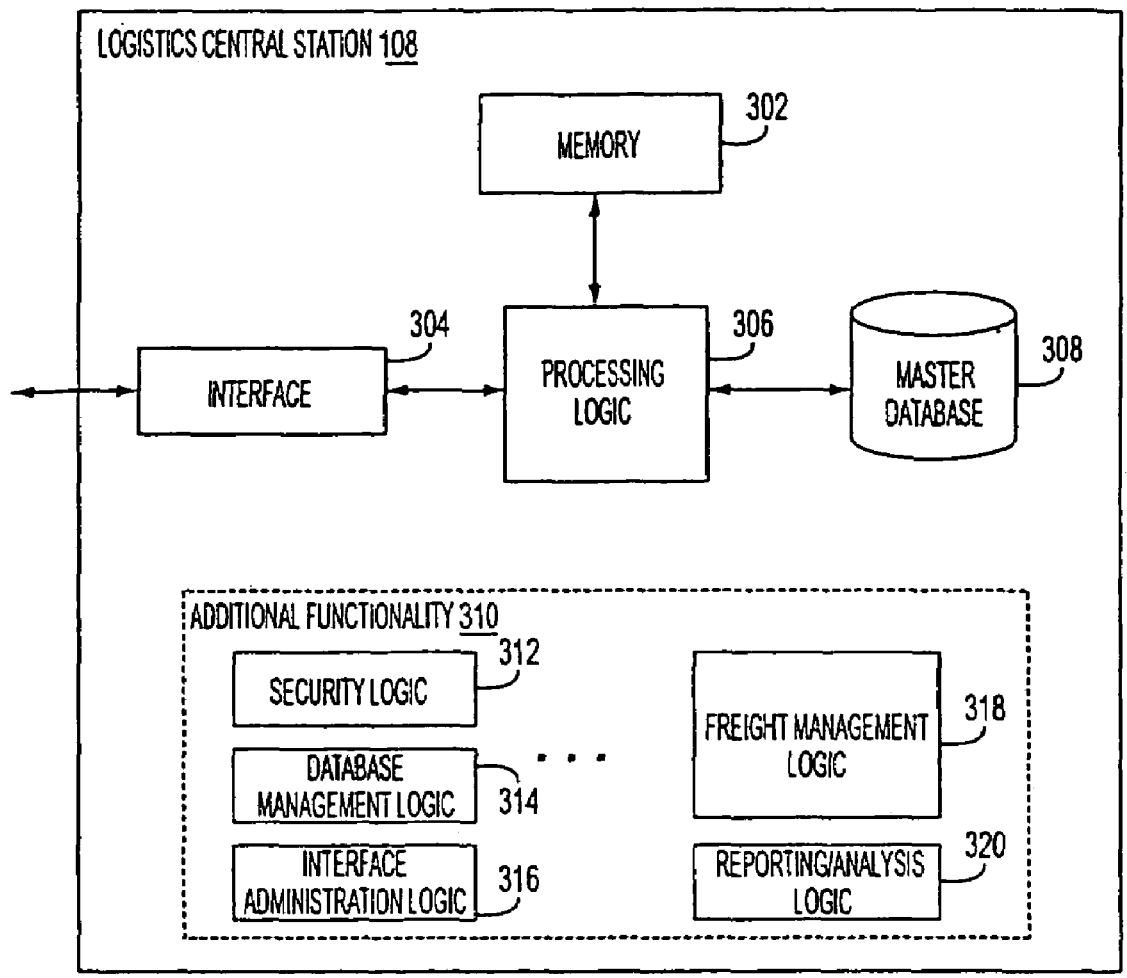
FIG. 3 shows an exemplary logistics central station for use in a logistics node shown in FIG. 1.

1. Exemplary System Architecture (FIGS. 1-3)

Figure 1:
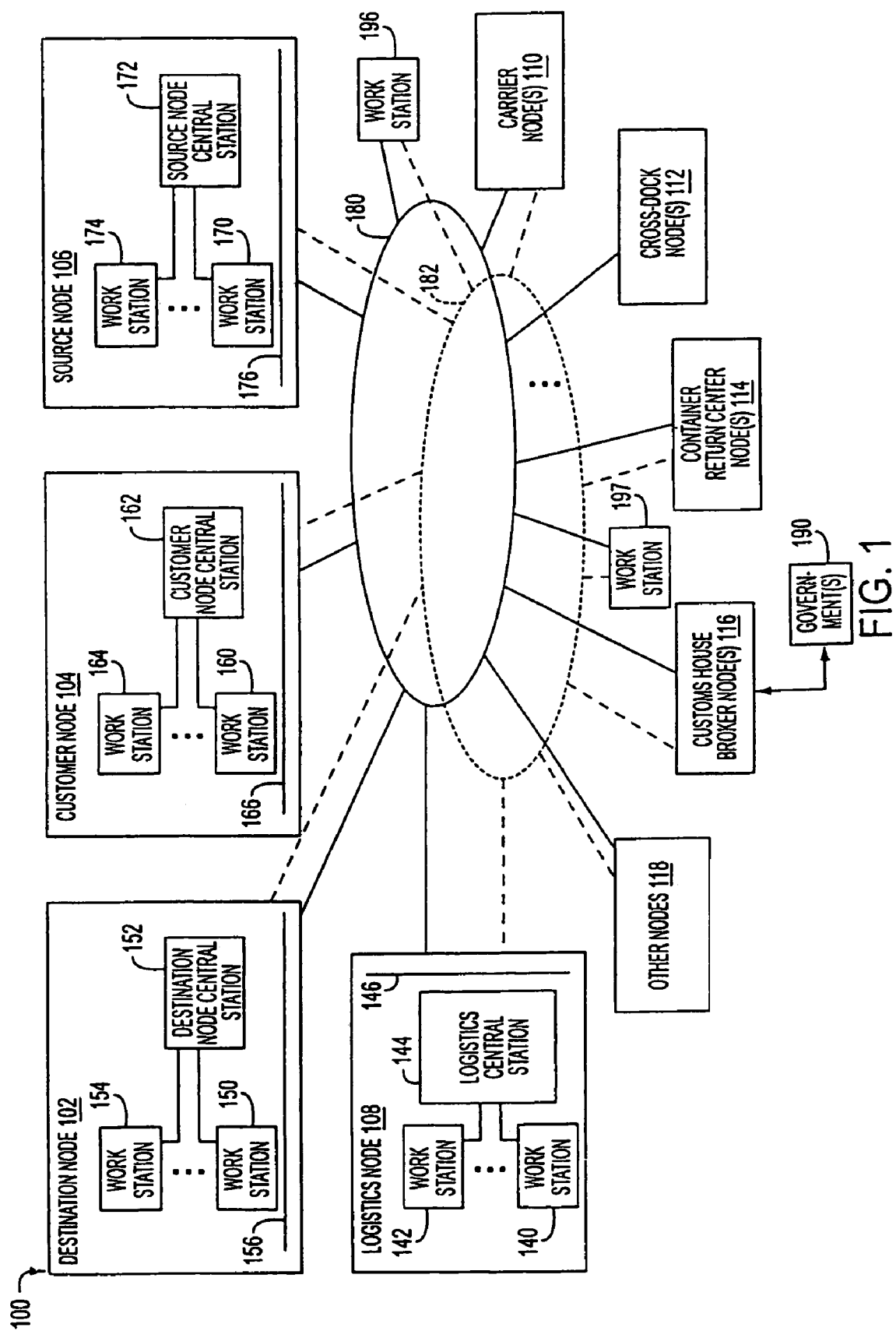
FIG. 1 shows an exemplary system for implementing the present invention.

FIG. 1 shows an exemplary system 100 that may be used to implement the principles disclosed herein. By way of overview, the system 100 includes plural nodes. As used here, a node loosely represents an "actor" involved in the distribution of a product. A node may include physical infrastructure, such as one or more physical facilities (e.g., shipping centers, manufacturing plants, etc.), as well as information technology (IT) equipment used at the facilities.

However, it should be noted that the equipment associated with a particular node may be distributed over plural sites. Further, the system 100 may permit a user who is affiliated with a particular node to use any equipment to access functionality appropriate to the user's affiliation, regardless of the location of the equipment. Accordingly, a piece of equipment owes its association with a node primarily based on the affiliation of the user that gains access to the system 100 using the equipment. Accordingly, FIG. 1's depiction of the nodes (e.g., as having discrete "boundaries") pertains more accurately to the logical organization of the system 100, rather than its literal physical organization.

The term "products," as used herein, refers to any type of transportable goods. For instance, the products may comprise parts used to manufacture machines (such as automobiles), raw materials (such as coal, scrap iron, etc.), chemicals and fuels (such as pesticides, fertilizers gases under pressure, propane, etc.), consumer items (such as electronic equipment, etc.), food (such as fruits, vegetables, processed and packaged foods, etc.), military cargo, and various other types of transportable goods. To facilitate explanation, portions of the ensuing discussion are framed in the exemplary context of the supply of parts to a manufacturing facility.

Turning now to the specifics of FIG. 1, a logistics node 108 acts as an information hub of the system 100. Namely, the logistics node 108 receives communications from other nodes in the distribution chain, and based thereon, coordinates the activities of the other nodes by transmitting appropriate instructions to the other nodes.

The distribution chain itself includes three principal actors, including a source node 106, a customer node 104 and a destination node 102. The customer node 104 generally represents an entity having a business objective which provides the impetus for the transfer of products from a source site to a destination site. For instance, the customer node 104 may correspond to a department within a manufacturing enterprise having the responsibility to obtain products for a manufacturing plant. The source node 106 generally represents the entity responsible for supplying the products at the command of the customer node 104. The destination node 102 generally represents the entity that receives the goods supplied by the source node 106. In a manufacturing context, for instance, the destination node 102 may represent a physical plant used to manufacture a product using the products supplied thereto.

Other nodes in the system include one or more carrier nodes 110, one or more cross-dock nodes 112, one or more container return center nodes 114, one or more customs house broker nodes 116, and various other nodes 118 that may be appropriate to a particular business setting. Alternatively, a particular business setting may not require the services of one or more of the nodes shown in FIG. 1.

The carrier nodes 110 represent various carriers that can be employed to transport products from a source site to a destination site (or to some intermediary site). One or more carrier nodes 110 may be affiliated with (and operated by) the logistics node 108. Other carrier nodes may comprise separate business entities (e.g., separate commercial shipping carriers) that operate in an independent fashion from the logistics node. In this case, the logistics node 108 presents a central "nerve center" which governs the activities of the carrier nodes 110, e.g., on a contractual basis.

Potential carriers include trucks, railway carriers, air carriers, water-borne vessels, small package services, etc. Some of these services may operate by transporting products on fully loaded transportation mechanisms (such as a fully loaded truck). Other of these carriers may allow for the transportation of products on less than fully loaded transportation mechanisms (such as on trucks that are not at full loading capacity) (referred to as Less Than full Loads, or LTLs). Each of the carriers may operate one or more facilities for performing its ascribed shipping functions. Further, each of the carriers may administer a tracking service which allows it to monitor the location or status of products that it is carrying.

The cross dock nodes 112 may represent one or more facilities used to transfer products from one form of transportation to another. For instance, an exemplary cross dock node 112 may operate by transferring products from one carrier to another carrier. Alternatively, another exemplary cross dock node 112 may operate by transferring products from one type of package (e.g., container) to another, but otherwise using the same carrier service to transport the products.

Different business settings may employ the services of different types of cross dock nodes 112. In one setting, a cross dock node may perform a consolidation function. That is, this cross dock node takes products received from multiple different sources and transfers the products to a single form of transportation (such as space allocated on an ocean-going vessel). In another business setting, the cross dock node may perform a deconsolidation function. That is, this cross dock nodes may distribute products transported on a single mode of transportation to plural different forms of transportation. In still other business settings, the cross dock node may perform a freight forwarding function. In this context, the node simply receives and reships the products (e.g., using a different form transportation).

The container return center node(s) 114 may represent one or more facilities used to store and/or manage a collection of containers used in transporting the products.

The customs house broker node(s)116 may represent one or more facilities used to interact with one or more governments 190 for the purpose of obtaining clearance to either import goods from another jurisdiction (e.g., country) or to export goods to another jurisdiction (e.g., country). Obviously, shipping activities that take place within a single country can dispense with the services of these nodes.

Finally, other nodes 118 may be included to accommodate the unique requirements of particular business environments.

FIG. 1 indicates that multiple links can be used to interconnect the plural nodes of the system. One exemplary link 180 used to connect the nodes is the Internet. An Internet link may be desirable so as to take advantage of the global accessibility and wide acceptance of this form of communication. Another exemplary link 182 used to connect the nodes is the Electronic Data Interchange (EDI) (which pertains to a well-known protocol used to exchange business documents in a structured and pre-defined format). An EDI link may be desirable so as to accommodate users that already have an EDI processing infrastructure in place, and who accordingly prefer to continue transacting business using this protocol. In any given transaction, communication may be conducted entirely using the Internet, entirely using the EDI protocol, or by using the Internet to exchange some messages and the EDI service to exchange other messages.

More generally, the particular business environment may influence the propriety of the links used to interconnect the various nodes. Alternative types of links that can be used include: an intranet network; a PAN (Personal Area Network); a LAN (Local Area Network); a WAN (Wide Area Network) or a MAN (Metropolitan Area Network); a storage area network (SAN); a frame relay connection; an Advanced Intelligent Network (AIN) connection; a synchronous optical network (SONET) connection; a digital T1, T3, E1 or E3 line connection; a Digital Data Service (DDS) connection; a DSL (Digital Subscriber Line) connection; an Ethernet connection; an ISDN (Integrated Services Digital Network) line connection; a dial-up port such as a V.90, V.34 or V.34bis analog modem connection; a cable modem connection; an ATM (Asynchronous Transfer Mode) connection; an FDDI (Fiber Distributed Data Interface) connection; etc. The communication links may furthermore comprise (or provide access to) various types of wireless communication systems, including: a WAP (Wireless Application Protocol) link; a GPRS (General Packet Radio Service) link; a GSM (Global System for Mobile Communication) link; a CDMA (Code Division Multiple Access); a TDMA (Time Division Multiple Access) link; etc.

The links may further operate using a variety of known network enabling code, such as Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SNIL), Wireless Markup Language (WML), Java™, Jini™, C, C++, Perl, UNIX Shell, Visual Basic or Visual Basic Script, Virtual Reality Markup Language (VRML), and a variety of other types of protocols and/or platforms. The protocol deemed appropriate for use may depend, in part, on the technology currently being used by the parties involved in the shipping transaction, as well as the requirements of a particular application.

The information technology (IT) infrastructure employed by each of the nodes may vary widely depending on the equipment already in place at these nodes. With exemplary reference to the destination node 102, a typical organizational setting may provide one or more work stations (e.g., work stations 150 and 154) communicatively coupled to a central station 152. The destination node 102 may use an intranet or other type of local network to interconnect the work stations (150, 154) and the central station 152. The work stations (150, 154) may directly access the other sites in the system 100. Alternatively, the work stations (150, 154) may access other sites in the network 100 via the central station 152.

Firewall 156 provides conventional functionality for protecting the resources of the node from the deleterious impact of events occurring external to the node. The firewall 156 may also serve to prevent users within the node from taking actions that might jeopardize the integrity of node resources. In connection therewith, the node may use various encryption algorithms (such as SSL 128 bit encryption) when exchanging information with external resources and networks. Yet other security provisions may be used by the node, as will be apparent to those skilled in the art.

FIG. 1 shows that other nodes in the system 100 may have similar information technology infrastructures to destination node 102. Namely, customer node 104 includes work stations 160 and 164 tied to customer central station 162. Source node 106 includes work stations 170 and 174 tied to a central station 172. Logistics node 108 includes work stations 140 and 142 tied to a central station 144. Nodes 104, 106 and 108 may also employ associated firewall functionality 166, 176 and 146, respectively.

Although not shown, the other nodes in the system 100 (e.g., nodes 110, 112, 114, 116 and 118) may also each include a number of workstations and/or a central station, as well as additional equipment appropriate to these nodes.

In addition, the system 100 may include a number of separate work stations (e.g., work stations 196 and 197) that maintain remote affiliation with one or more nodes. More specifically, a work station's affiliation may depend on the affiliation of the user operating the work station. As such, a user associated with the customer node 104, for instance, can use any remote work station (such as work stations 196 or 197) to access functionality appropriate to the customer node. The system 100 may grant or block access to particular functionality based on the user's password (or other identifying information input to the work station).

FIG. 2 shows an exemplary work station (e.g., work station 154) for interacting with system 100 of FIG. 1. The work station includes any type of general or special purpose computer comprising conventional hardware, such as a bus 214 connected to a RAM memory (Random Access Memory) 206, ROM memory (Read-Only Memory) 204, storage device 202, processor 216, and communication interface 218 (which provides access to remote resources via communication line 220). The processor 216 can comprise any type of microprocessor or other logic-executing unit, such as an Intel x86-based device, etc. The processor 216 may further execute instructions specified by any type of operating system program, such as Microsoft Windows™, etc. The storage device 202 may comprise any type of storage media, such as any type of magnetic or optical media (e.g., CDROM).

The work station 154 further includes an input/output interface unit 208. The interface unit 208 may include one or more rendering devices 210 for presenting information to a user (e.g., using a display, printer, audio output, etc.). The interface unit 208 may further include one or more input devices 212 for use in inputting information to the work station 154 (e.g., using a keyboard, touch-sensitive panel or screen, speech recognition input, etc.).

FIG. 2 indicates that the work station 154 also includes addition functionality 222. This additional functionality 222 may represent different programs and/or hardware for implementing one or more functional features provided by the work station 154. For instance, the work station 154 may include security logic 224 for performing various security-related functions, and reporting/analysis logic 226 for performing various reporting and/or analysis functions based on information obtained from the logistics node 108. The work station 154 may incorporate yet further functionality (not shown) appropriate to particular business settings.

In an alternative embodiment, various other types of work stations can be used to interact with the system 100. For example, the work station can be embodied as any type of wireless mobile station (e.g., having Internet browsing capability), a radio-enabled Palm™ Pilot or similar unit, various types of "smart" appliances, various modules installed in one or more vehicles, etc. The work station may additionally include means for receiving Global Positioning System (GPS) data. Such data may allow the work station to determine its position and to forward its position to the logistics node 108. Such data, for instance, may better enable the logistics node 108 to determine the status of a delivery (e.g., by tracking the location of a carrier).

FIG. 3 shows an exemplary structure of the central station 144 used in the logistics node 108. The central station 144 includes at least one processing logic unit 306 (e.g., CPU) connected to at least one memory device 302, at least one database 308, and at least one communication interface 304. The interface 304 allows the central station 144 to interact with various external entities, such as other nodes in the system 100. The central station 144 may embody various types of architectures, such as a mainframe architecture, a server architecture (e.g., in the context of a client-server environment), or some hybrid form of architecture. In one embodiment, for instance, the central station 144 uses mainframe technology to ensure the reliability and integrity of its services, but includes a "front end" that allows it to interact with the Internet (or other network). Still other architectures are possible to accommodate the existing equipment used by various business entities, and to take account for various other considerations.

The database 308 contains various information concerning the shipment of products, as discussed in further detail in section No. 3 below. The database 308 can be implemented using any type of storage media. For instance, it can comprise a hard-drive, RAM memory, magnetic media (e.g., discs, tape), optical media, etc. Further, the database may be implemented as a an Oracle™ relational database sold commercially by Oracle Corp. Other database protocols can be used to implement the database, such as Informix™, DB2 (Database 2), Sybase, etc. The database 308 may comprise a single archive of information maintained at a single site, or may comprise a group of interconnected archives retaining information in a distributed fashion. Further, parts of the database 308 may be located at facilities that are remote from the central station 144.

According to a variation, various modules of the logistics central station 144 can be implemented as separate computers. The separate computers (not shown) may be located together in one facility or located remotely from each other.

The logistics central station 144 may also include a number of programs 310. The programs 310 may include security logic 312 for ensuring the integrity of various functionality and resources provided by the logistics central station 144. The security logic 312 may further include an encryption/decryption engine (not shown) for encrypting and decrypting information transmitting from/to the central station 144.

The programs 310 may also include database management logic 314 used for storing, retrieving and/or otherwise manipulating information stored in the database 308.

In addition, the programs 310 may include interface administration logic 316 for providing a number of different interfaces that can be used by work stations to interact with the central station 144. For instance, the logistics central station 144 may provide a first interface for users associated with the source node 106, a second interface for users associated with the destination node 102, and a third interface for users associated with the customer node 104. As explained in further detail in section No. 3 below, these three interfaces provide access to respective different sets of tools depending on the node with which the user is affiliated (e.g., as reflected by the user's password entered into the work station).

The programs 310 may also include freight management logic 318. This logic performs various tasks involved in the shipment of products from a source site to a destination site, such as calculation of shipping plans, the determination of preferred carriers, etc.

Additional logic (not specifically identified in FIG. 3) can be included to implement each of the functions identified in section Nos. 3 and 4 of this application. For instance, the logistics central station 144 can include separate programs/logic to implement each of the functions accessible via the interface screens discussed in section No. 3 below.

The central stations used in other nodes may resemble the architecture shown in FIG. 3 (but will include functionality appropriate to the services and operations provided by the other respective nodes).

2. Exemplary System Operation (FIGS. 4-8)

2(a). Exemplary Freight Processing Overview (FIG. 4)

Figure 4:
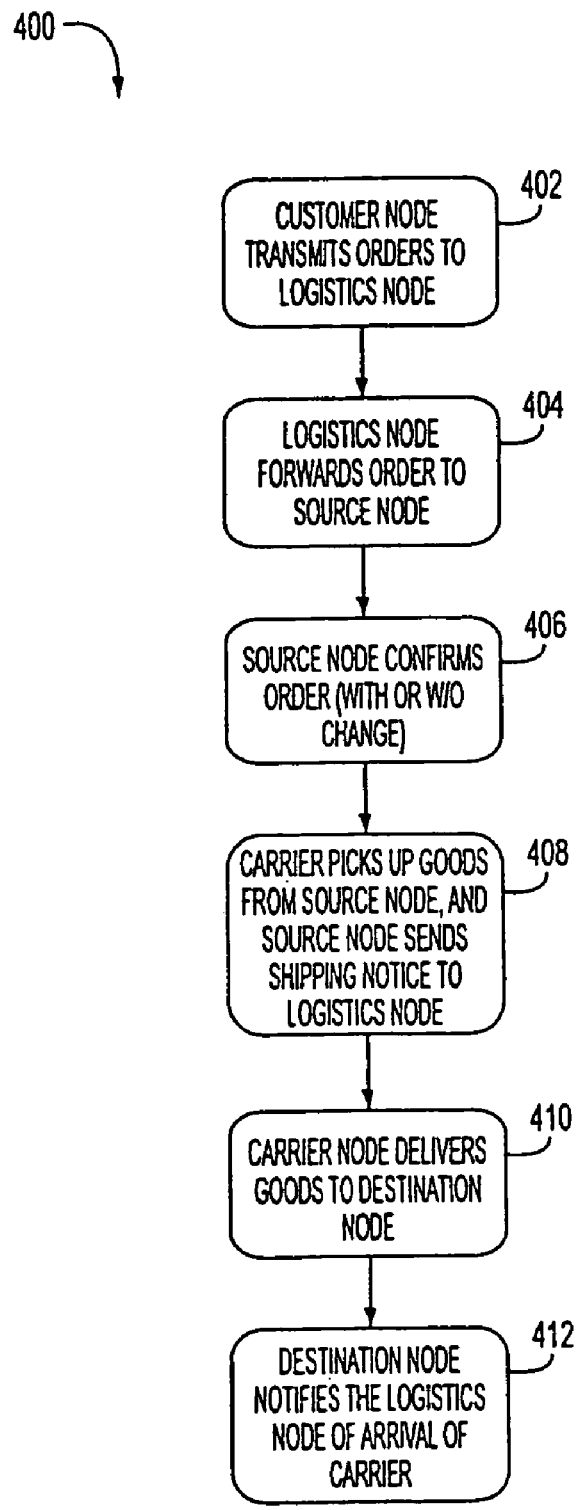
FIG. 4 shows an overview of an exemplary process for performing aspects of the present invention.

FIG. 4 provides a high-level overview of an exemplary process for shipping products using the system of FIG. 1. It begins in step 402, where the customer node 104 transmits purchase orders to the logistics node 108. These purchase orders contain instructions that direct the source node 106 to deliver products to the destination node 102. (As described above, the customer node 104 may represent a corporate entity that generates the purchase orders to direct a supplier to ship products to one of the corporation's manufacturing plants.)

The logistics node 108 then forwards the orders to the source node 106 in step 404. In step 406, the source node 106 receives, reviews, and confirms the orders. More specifically, the source node 106 may confirm the orders with or without making changes to the orders. Notice of the source node's confirmation (and any alterations in the orders) is then sent back to the logistics node 108.

A carrier then picks up the goods at the source node 106, which prompts the source node 106 to generate a shipping notice (in step 408).

Thereafter, in step 410, the carrier delivers the goods to the destination node 102, which prompts the destination node 102 to notify the logistics node 108 of this event (in step 412).

2(b). Exemplary Detailed Process Flow (FIG. 5)

Figure 5A:
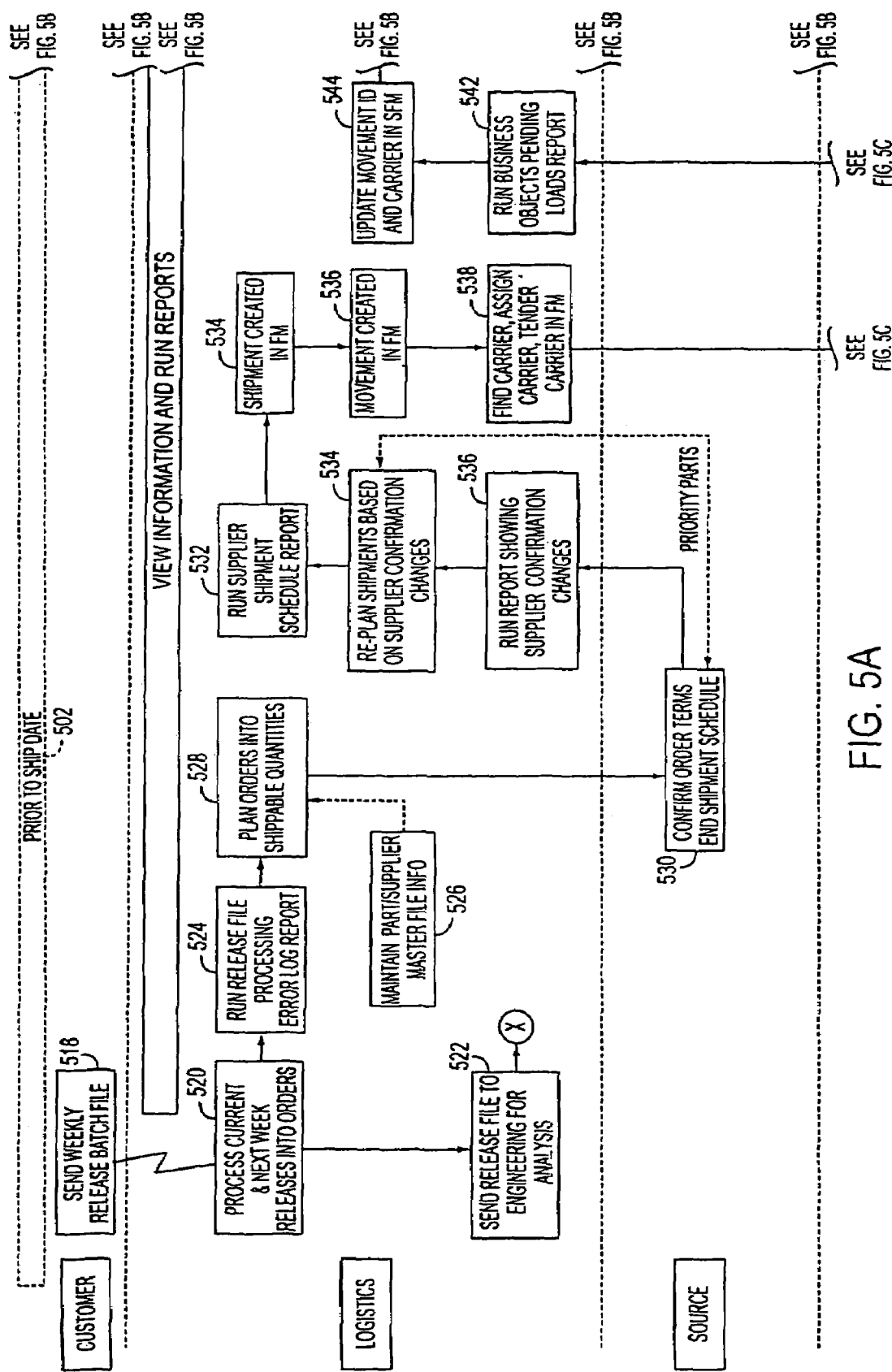
FIG. 5 (which includes FIGS. 5A, 5B, 5C and 5D) show further exemplary detail pertaining to the process of FIG. 4.
Figure 5D:
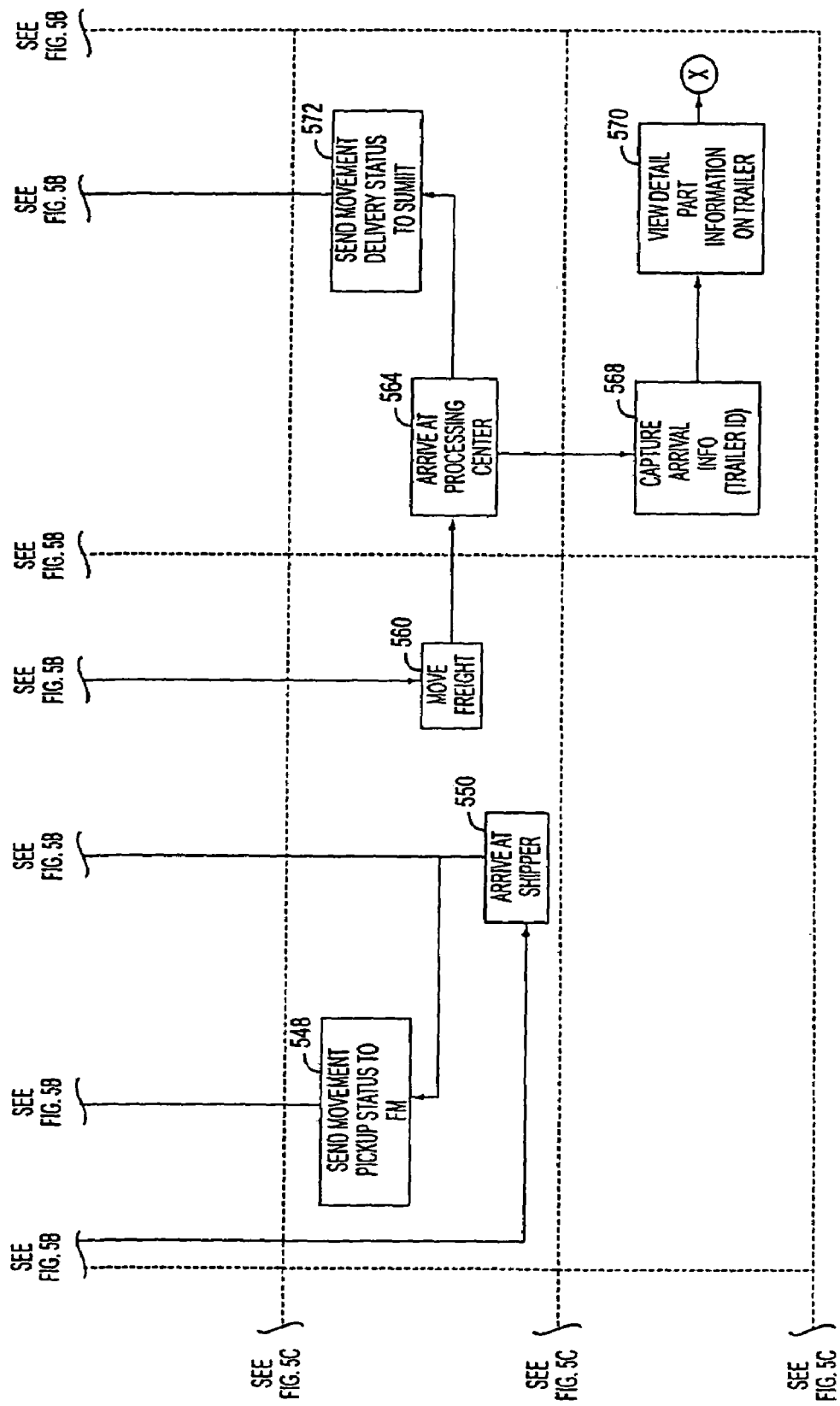

FIG. 5 illustrates an elaboration on the principal steps shown in FIG. 4 in one exemplary shipping context. As to presentation scheme, FIG. 5 groups the steps into categories demarcated by dashed horizontal lines to indicate the "actors" responsible for performing the steps. The actors include a logistics node, customer node, source node, and destination node (such as, respectively, the logistics node 168, customer node 104, source node 106, and destination node 102 shown in FIG. 1). Further, FIG. 5 groups the steps into categories demarcated by dashed vertical lines to indicate shipping phases in the process flow. The phases include a "prior to ship date" phase 502, a "ship date" phase 504, and an "arrival date" phase 506. As these labels suggest, the "prior to ship date" phase 502 corresponds to those actions performed by the system prior to the date that the products are shipped from the source site. The "ship date" phase 504 corresponds to those actions performed substantially on the date that the products are shipped from the source site. The "arrival date" phase 506 corresponds to those actions performed substantially on the date the products arrive at the destination site.

The process starts out in step 518. In this step, the customer sends a weekly release batch file to the logistics node. In one exemplary embodiment, the release batch file identifies the customer's purchase orders over a time span of one or more weeks (e.g., in one exemplary embodiment 15 to 17 weeks in the future). Each purchase order may specify one or more products, one or more suppliers that will furnish the products, and one or more destination sites that will receive the products. (Note that step 518 generally corresponds to step 402 in FIG. 4.)

The customer can use any technique to transfer the batch file to the logistics node. The technique used may depend on communication equipment in place at the customer node and/or the logistics node. For example, the customer may transfer the batch file using e-mail messaging. Upon receipt, the logistics node may then manually transfer the information contained in the e-mail message to an appropriate file (or files) in the logistics node. In an alternative embodiment, the customer may use any type of electronic transfer which directly feeds the batch file into the appropriate receiving file(s) maintained by the logistics node, thus eliminating the need for any type of manual transfer operations.

The logistics node receives the file and, in step 520, processes the current and next week's purchase orders. Part of this processing may involve comparing the purchase orders identified in the most recent batch file with purchase orders identified in a previous batch file for an identified time period, such as the current week. The most recent batch file may differ from a previous batch file because a customer may have canceled a previous order, added a new order, or changed any of the attributes of a pending order (such as product numbers, quantities, suppliers, destinations, etc.). These discrepancies are resolved in an appropriate manner, e.g., by updating the purchase order files maintained by the logistics node.

Another part of the processing encompassed by step 520 may entail reviewing a prior week's orders vis-a-vis the orders that were actually executed to identify discrepancies. For instance, the comparison may indicate that some orders were not executed. The logistics node notes these discrepancies and addresses these discrepancies in an appropriate manner, e.g., by canceling or rescheduling the orders.

In step 522, the logistics node sends the release file (i.e., purchase order file) to an "engineering" department for analysis. This department may perform various network planning studies on the basis of orders placed in a defined time span (such as several weeks).

Then, in step 524, the logistics node runs a release file processing error log report. This processing may involve examining the orders to identify any undefined information. For instance, the release file may contain product codes, supplier identifiers, destination site identifiers, etc., that the logistics node has not previously encountered, and may therefore have difficulty interpreting. The logistics node culls out this undefined information and places it in a separate holding file (for later separate processing).

Step 526 involves maintaining a master database that stores shipping information. This information may pertain to the physical characteristics of the products (e.g., size and weight of the products), the physical characteristics of the packages (e.g., boxes) used to house the products, and/or the physical characteristics of the containers (e.g., racks, palettes, etc.) used to transport the packages on the carriers. The information may also pertain to the physical characteristics and constraints of the shipping space provided by various carriers. The information may also pertain to the rates charged by various carriers.

In step 528, the logistics node plans orders into "shippable quantities." One aspect of this step involves scheduling the shipments so as to even out flow of products arriving at the destination sites. This ensures that the destination sites are not deluged with a large number of deliveries on one day of the week. The logistics node may make this determination based, in part, on prior analysis performed in step 522.

Another aspect of step 528 involves scheduling the shipments from a supplier (i.e., source site) so as to consolidate shipments. For instance, the customer may request that a particular supplier make two separate shipments on two respective days in one week. In this case, the logistics node may combine these shipments into a single shipment (if possible) to reduce shipping costs.

Another aspect of step 528 involves selecting a suitable mode of transportation to ship the products. For instance, in one particular embodiment, the logistics node selects one of three different shipment modes to transport the products. The modes comprise: (1) a small package shipment; (2) a "Less Than Truckload (LTL) shipment (pertaining to a shipment that does not fill an entire truckload); and (3) a full truckload shipment. In determining the mode, the logistics node 108 may draw from the information maintained in step 526 (discussed above).

The logistics node then contacts the supplier in step 530 to convey a proposed (e.g., tentative) shipment plan to the supplier. As will be described in greater detail in section No. 3 below, the supplier reviews the tentative plan to determine whether it can satisfy the order. For instance, the supplier determines whether it can ship the requested quantity of goods on the requested shipment date. If so, the supplier confirms the plan without revisions. If the supplier cannot satisfy the requested shipment, the supplier may revise the plan and then communicate its revision back to the logistics node. The logistics node uses the revised plan to generate a modified shipping plan (if possible). (The above described series of operations generally corresponds to steps 404 and 406 of FIG. 4.) If the source node has made changes to the orders, the logistics node runs a report showing these changes (in step 536).

The logistics node then advances to step 534 to perform replan shipment processing. This step may allow the logistics node to review problematic shipments and make any changes that may be appropriate. For instance, the source node may have identified potential problems in the shipment plan. For example, the logistics nodes may have initially specified that the shipment was to use an LTL carrier. The supplier, however, may have objected to this mode of shipment in step 530 (e.g., by forwarding comments to the logistics node through an appropriately configured confirmation screen). Alternatively, the impracticality (or inefficiency) of a plan may have been recognized through independent means. In any event, the replan step gives the logistics node an opportunity to revisit the plan and make any changes that may be appropriate. One or more interface screens may be provided to facilitate this task (as will be discussed in section No. 3 of this application). For instance, one exemplary replanning screen gives the user a chance to break the shipment up into multiple parts to resolve scheduling difficulties.

In one embodiment, the above-described replanning operation may be executed by logistics personnel. In another embodiment, the replanning operation may be performed by source site personnel (e.g., by a supplier). In another embodiment, the replanning responsibility may be shared between the logistics node and the source node.

In step 532, the logistics node runs a supplier shipment schedule report.

In steps 534-538, the logistics node analyzes the orders and selects one or more carriers to transport the products. Various criteria can be used to govern the selection of carriers. For instance, the logistics node can maintain a list of preferred carriers. The logistics node may select carriers from this list based on their availability and ability to perform the shipment, and also based on their respective rates. That is, in one exemplary embodiment, if multiple carriers are available to make a shipment, the logistics node may select the least expensive carrier. Steps 534-536 may also determine whether it is most efficient to schedule the shipment in a series of separate "legs." For instance, the logistics node may determine whether it is desirable to use a LTL carrier to pick up the product at the source node, and thereafter combine the product with other shipments at one or more cross dock nodes.

In step 538, the logistics node conveys instructions to one or more carriers (e.g., the "tender carrier" subtask of step 538). In step 540, the carrier(s) receive and acknowledge their respective shipping instructions. In step 542, the logistics node runs various load reports (appropriate to a particular shipping context). In step 544, the logistics node updates the movements of the carrier.

In step 550, the carrier arrives at the source node. In step 548, the carrier then sends its movement pickup status to the FM functionality of the logistics node. This information is received by the logistics node in step 546, upon which the logistic node updates shipment status information.

The supplier updates its shipping notice information in step 552 to reflect the loading of the carrier (in step 538). The supplier then forwards shipping status information to the logistics node. In step 554, the logistics node responds to this information by running a report showing the confirmed shipping plans vs. actual shipping plans (in step 554). This step identifies differences between the planned shipment and the shipment that was actually loaded on the carrier. In step 556, the logistics node updates its internal database to reflect the items that actually were shipped.

After being loaded (in step 558), the carrier moves the freight in step 560, and eventually arrives at the destination node in step 564. (Note that this step generally corresponds to step 410 in FIG. 4). The destination node responds by capturing arrival event detail (such as trailer ID) (in step 568). In step 570, the destination node may examine detailed information pertaining to the contents of the trailer that has arrived. This capability is further discussed in section No. 3 of this application. By way of preview, the destination node may determine whether there are any priority items on a particular shipment by examining a screen which breaks down a load to its individual product constituents. The shipment assumes the priority level of the product in the shipment having the highest priority level.

The carrier also sends its movement delivery status to the FM functionality of the logistics node in step 572. (This step generally corresponds to step 412 in FIG. 4). In step 575, the logistics node responds by updating the status of the carrier.

2c. Hot List Processing (FIG. 6)

Figure 6:
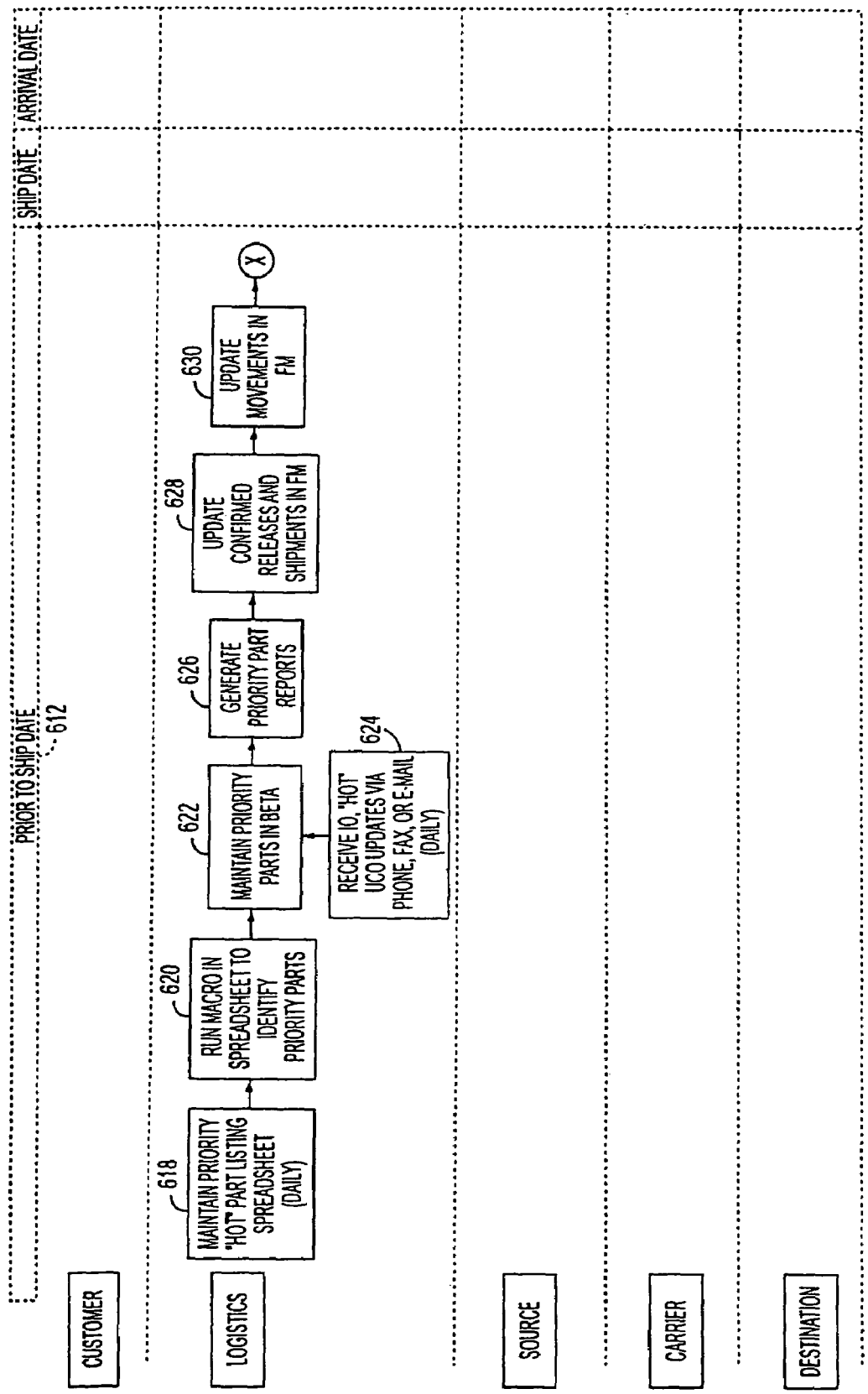
FIG. 6 shows an exemplary "Hot Parts List" process of the present invention.

FIG. 6 shows a process for changing the priority status of shipments. In step 618, the logistics node receives a list of "hot" items. Such items are deemed "hot" because they require expedited handling or delivery.

In step 620, the logistics nodes compares the list of "hot" items against a master list of items. The master list identifies products that the system is currently obligated to ship on behalf of its customers. The system may cull out those items in the list of "hot" items that are not present in the master list.

In step 624, the logistics node may receive updates regarding priority items from a plurality of modes of communication, such as telephone, facsimile, e-mail, etc.

In steps 622 and 626, the logistics node processes the collected priority information to resolve the priority status of products, and to generate one or more reports appropriate to a particular shipping environment.

In step 628, the logistics report updates confirmed releases (purchase orders) and shipments in the FM functionality. In this step, the logistics node may further change the priority level assigned to the products. Section No. 3 of this application provides further details on exemplary mechanisms for performing this task.

In step 630, the logistics node terminates the priority processing routine by updating the movements of the products using the FM functionality.

2(d). Exemplary Message-Exchange Protocol (FIG. 7)

Figure 7:
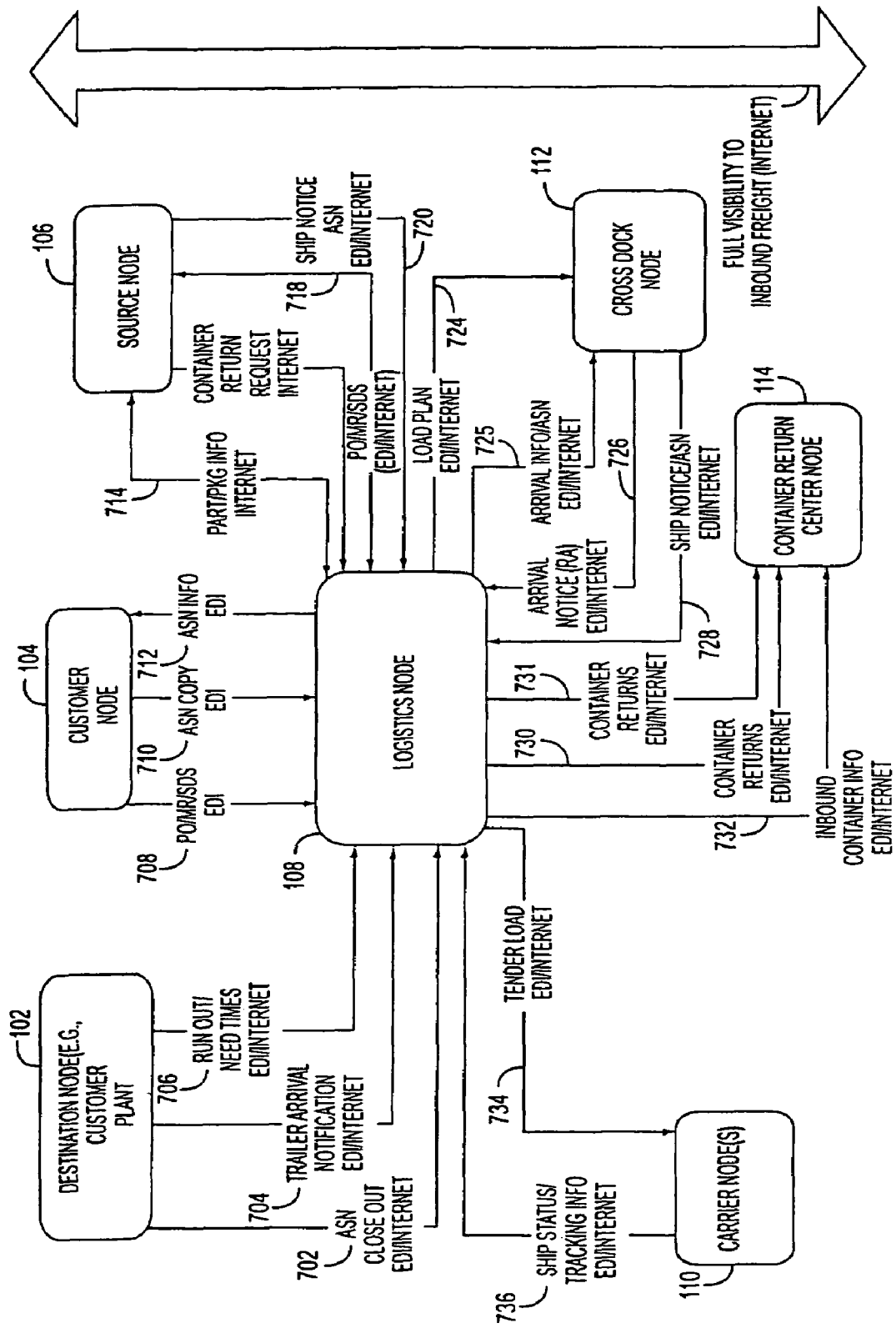
FIG. 7 shows a message-exchange protocol pertaining to the process of FIG. 4.

FIG. 7 identifies messages exchanged between nodes in the system of FIG. 1 when performing the general processes discussed in connection with FIGS. 4 and 5.

The process begins when the customer node 104 sends a copy of Purchase Orders (PO), Materials Requisition (MR) or Supplier Daily Schedules (SDS) to the logistics node 108 (note transfer path 708 in FIG. 7, labeled "PO/MR/SDS"). (Note that his operation generally corresponds to step 402 in FIG. 4 and step 518 in FIG. 5). In one exemplary embodiment, the customer may transmit this information to the logistics node 108 two to three days in advance of shipping. The logistics node 108 receives and stores a copy of this information. The customer may also directly transmit this information to the source node 106.

The logistics node 108 combines the received PO/MR/SDS message with shipping instructions to form supplemented information. The logistics node 108 sends this supplemented information to the source node 106 (note data path 718). The transmitted information may include an identification of: (a) the products and quantities to be shipped; (b) the date and time when the products are required; (c) the destination that the products should be shipped to; and (d) the carrier that will be picking up the products. (Note that this step generally corresponds to step 404 of FIG. 4).

Upon receipt of the above information, the supplier (at source node 106) confirms its ability to supply the products on the requested terms or on modified terms. (This step generally corresponds to step 406 of FIG. 4 and step 530 of FIG. 5). The supplier's confirmation may identify the quantity of products that the supplier 106 has available for shipment and the date and time that the supplier can make the shipment. In response to this message, the logistics node 108 notes any variation between its original order requirements and the modified orders specified by the supplier.

After performing various shipment planning functions (described above with reference to FIG. 5), the logistics node 108 tenders a load to the carrier 10 (in path 734). Thereafter, the carrier node 110 may send shipment status information at milestones in the load's transit (in path 736).

When the carrier leaves the source node 106 with a given order, the supplier sends a message to the logistics node 108 informing the source node 106 of the makeup of the actual shipment loaded onto the carrier (note path 720). (Note that this step generally corresponds to step 408 in FIG. 4, and step 552 in FIG. 5). A bill of lading is also printed at this time. The shipping notice information (i.e., the Advance Shipping Notice or "ASN") may contain the following information: (a) the actual quantity of products shipped; (b) the actual date/time shipped; (c) the carrier and trailer number of the shipping carrier; and (d) a bill of lading number.

The logistics node 108 then sends the customer node 104 a standard ASN transaction assembled from the information collected from the source node 106 (in path 712). Alternatively, the source node 106 may send ASN information directly to the customer node 106. In this case, the customer node 104 sends the ASN information to the logistics node 108 (in path 710).

The logistics node 108 also forwards a load plan for outbound shipments to the cross dock node 112 (in path 724). The logistics node 108 may generate the load plan using an optimization process, such as consolidation analysis, breakdown analysis, cross dock/pooling point analysis, carrier selection analysis, etc. In response. the cross dock node 112 loads the outbound trailers as inbound trucks arrive.

The logistics node 108 also sends the cross dock node 112 ASN information received from the suppliers (in path 725). The cross dock uses this information to plan daily work assignments. Thereafter, the cross dock node 112 notifies the logistics node 108 when a trailer has arrived (in path 726). This information is used by logistics node 108 in tracking the progress of the products through the chain of distribution. Such tracking information can also be forwarded to the customer node 104. Among other uses, this information provides an indication of how quickly a facility can "cross dock" a given product. Finally, the cross dock node 112 notifies the logistics node 108 when a trailer has departed from its facilities (in path 728). This information enables the logistics node 108 to track the progress of the shipment and also allows the destination node 102 to plan for receipt of the products. Further, this information allows the logistics node 108 to determine how quickly the cross dock node 112 is processing shipments through its facilities (that is, when this information is combined with previously transmitted information regarding the receipt of the shipment at the cross dock node 112).

The destination node 102 notifies the logistics node 108 upon arrival of the trailer (in path 704). This information is used for: (a) yard management logging of arrived but not unloaded trailers; (b) carrier performance reporting; and (c) timely completion of activities in the system. (Note that these operations generally correspond to steps 410 and 412 or FIG. 4, and step 572 of FIG. 5).

The destination node 102 then notifies the logistics node 108 when the trailer has been unloaded and the products received into their inventory (in path 702). This information is used for: (a) yard management logging of empty trailers; (b) performance reporting for the customer receiving location; and (c) notification to suppliers that payment will soon be processed.

Reusable container inventories used by the suppliers at the source node 106 should be replenished regularly to maximize utilization of containers. In connection therewith, the supplier may send a message to the logistics node 108 (in path 716) requesting a replenishment of the supplier's container inventory. The logistics node 108 then schedules container return shipments from the container return node 114 to the source node 106. The logistics node 108 then sends a request for container shipments to the container return node 114 (in path 731). Information transferred in this communication may include an indication of: (a) the container type(s) that are being requested; (b) the quantities to be shipped; (c) the date and time when the containers are needed; (d) where the product will be shipped; and (e) the carrier that will pick up the containers. The container return node 114 then confirms the request for containers by transmitting a message back to the logistics node 108 that specifies a quantity available to be shipped and date and time on which they can be shipped. The logistics node 106 notes any divergence between the amount of containers requested and the amount offered.

Further, the container return node 114 may independently notify the logistics node 108 when it is ready to provide containers (in path 730). The logistics node 108 uses this information to schedule a time when these containers can be picked up and returned to the source node 106. Further, containers on inbound shipments to the destination node 102 may be sent to the container return node 114 so that a given supplier can decrement its inventory of containers (in path 732).

Further, the logistics node 108 may request product/packaging information from the source node 106 (in path 714). The logistics node 108 updates its database when it receives this information. Weight and cube information contained in this information is particularly useful in building shipments (e.g., as described with exemplary reference to step 528 of FIG. 5).

Further, the destination node 102 notifies the logistics node 108 when it is projected to "run out" of products necessary to perform its function (in path 706). Such information may be valuable for tracking purposes, and to anticipate and appropriately react to shortages in products.

The logistics node 108 may store information pertaining to shipments in its database 308 (such as, but not limited to, the shipping information discussed above). The logistics node may further allow users to access the stored information (if the user's are deemed to have appropriate authorization to view the information). In this sense, the information maintained by the logistics node 108 is "visible" to users associated with different nodes. FIG. 7 illustrates this aspect of the system using the double-headed arrow bearing the legend "full visibility to inbound freight."

The above-discussed messaging between nodes can be performed using, for instance, the Internet, EDI, or some combination of these two protocols, or some other type of protocol.

2(e). Exemplary Freight Processing for an Export Application (FIG. 8)

The message-exchange protocol shown in FIG. 7 is particularly applicable to the transfer of goods from a supplier to a manufacturing plant within the borders of a single jurisdiction (e.g., a single country). Nevertheless, the basic protocol identified in that figure can be applied to various other situations involving the transfer of products from a source site to a receiving site. For instance, the protocol described in FIG. 7 can be applied to the export or import of goods across jurisdictional boundaries (such as from one country to another).

Figure 8:
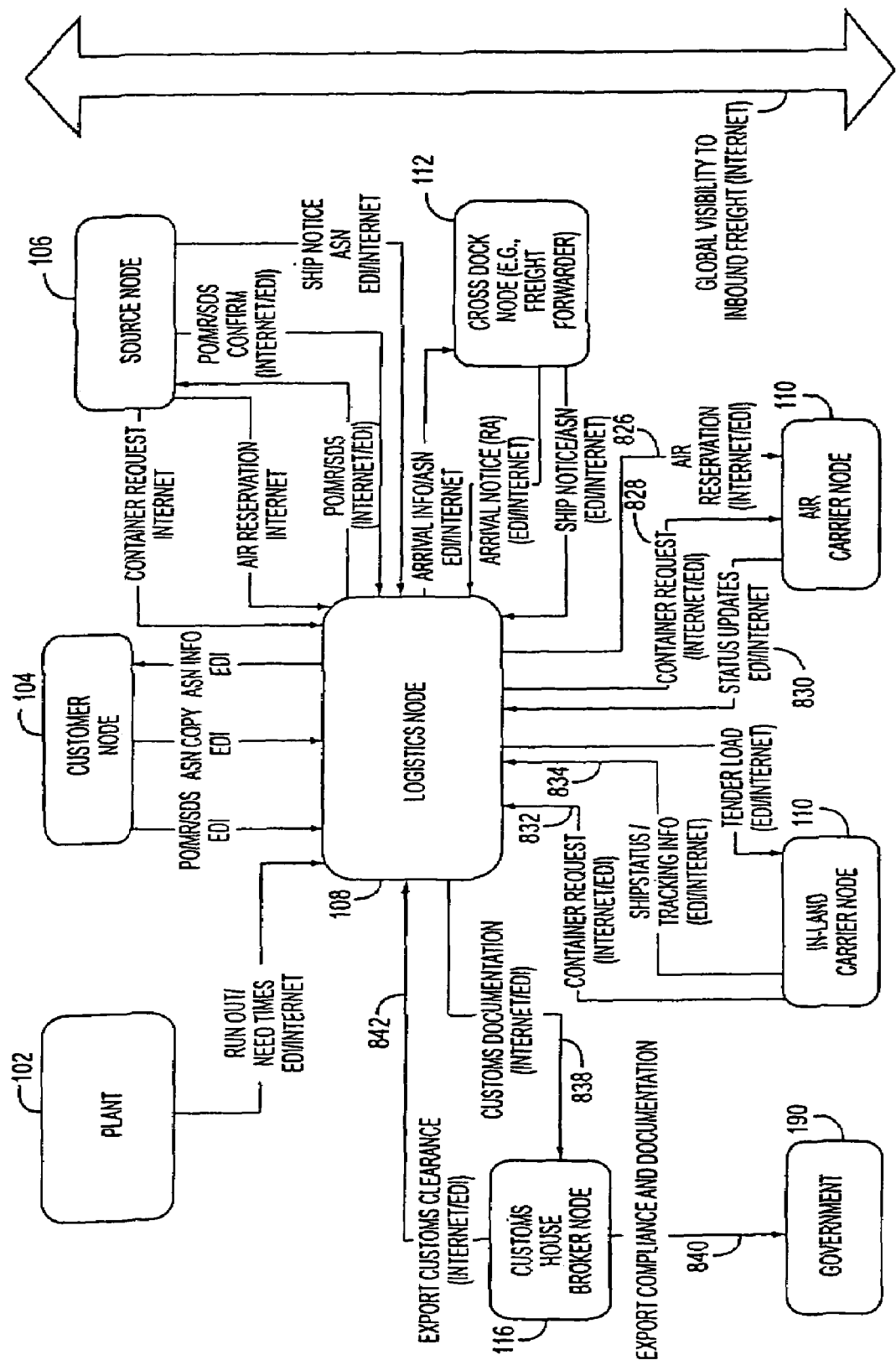
FIG. 8 shows another message-exchange protocol pertaining to the process of FIG. 4, particularly pertaining the export of goods.

FIG. 8, for example, pertains to a modification of the technique of FIG. 7 for exporting products using an air carrier. At least two aspects of the process of FIG. 8 differ from the protocol of FIG. 7. First, the international aspects of the shipment require the involvement of customs house broker (CHB) nodes 118. Second, the international aspects of the shipment typically involve more complex carrier and cross docking interaction. These two aspects are emphasized below in the discussion of FIG. 8. Other aspects of the exchange have been previously explained with reference to the protocol of FIG. 7, and accordingly are not repeated below.

As to the customs house broker (CHB) aspects of FIG. 8, the logistics node 108 typically forwards a copy of documentation necessary for customs clearance to the CHB node 116 (in path 838 of FIG. 8). This documentation may include information such as bills of lading, invoices, shipment contents, etc. The CHB node 116, in turn, may forward export compliance and other related documentation to an appropriate government agency (in path 840). When the government agency notifies the CHB node 116 of the export's clearance, the CHB sends a status report to the logistics node 108 (in path 842) to notify that node of the clearance. The CHB's status report may alternatively include an update about any shipments delayed or detained at customs. The logistics node 108 receives the status information and stores this information in form that may be accessed by authorized parties, thus further enhancing the "visibility" of the interface.

In an import context (not shown), the CHB node 116 notifies the logistics node 108 when a shipment clears customs using a delivery order. This triggers the logistics node 108 to arrange the next stage of the product's transportation.

As to the carrier and cross docking aspects of FIG. 8, the in-land carrier sends a request for air containers to load the product (path 832). The logistics node 108 then passes the request on to the air carrier node (in path 828). It may further be necessary to reserve space on a given air craft or vessel by specifying a shipment date on a selected air craft or vessel (in path 826). Both the in-land carrier node 110 and the air carrier node 110 may regularly send shipment status and tracking information to the logistics node 108 (e.g., in paths 834 and 830, respectively).

The freight forwarder node 112 functions in a similar manner to the cross-dock node 112 in FIG. 5. In addition, export or import using an ocean-going vessel may require processing at a consolidating/deconsolidating node (not shown in FIG. 8).

3. Exemplary Interface Features (FIGS. 9-12)

3(a). Overview of Screen Presentations

As mentioned above, the logistics node 108 provides plural levels of access to the shipping service corresponding to plural respective classes of users. In one exemplary embodiment, a first interface is provided to those individuals involved in the supply aspects of the shipment chain. This interface is referred to as the "source view." It contains a first set of functions for interacting with the shipping service. A second interface is provided to those individuals involved in the receiving aspects of the shipment chain. This interface is referred to as the "destination view." It contains a second set of functions for interacting with the shipping service. A third interface is provided to the customer, or more generally, the entity that directs the flow of goods from the source site to the destination site. This interface is referred to as the "customer view." It contains a fourth set of functions for interacting with the shipping service. Finally, a logistics interface is provided to those personnel associated with the logistics node. It contains a fourth set of functions for interacting with the shipping service.

The system 100 administers the interfaces using the interface administration logic 316 shown in FIG. 3. This logic 316 controls the functionality provided to different users based on their membership in one or more of the above-identified classes. More specifically, this logic maintains a file which correlates user passwords with functionality associated with the passwords. Thus, when a user logs onto the system, this logic associates the user's password with an indication of their membership in one of the above-identified classes, and then delivers the interface appropriate to that membership. Of course, if the user does not belong to any class, the interface administration logic will prohibit access to system services.

By virtue of the above-identified features, a user may access functionality appropriate to the user's membership status anywhere in the system 100. For instance, a customer having appropriate clearance to access the "customer view" may access this interface from any computer located at any site. However, different business environments may place different constraints on remote access of shipping information. For instance, the logistics node may allow users to access highly sensitive shipping functions only from prescribed sites.

The ensuing discussion relates to one exemplary application of the invention. In this application, the logistics node coordinates the shipment of parts from a source node (comprising a parts-supplying node) to a destination node (comprising a parts-receiving manufacturing node). However, it should be noted that the interface can be used to coordinate the transfer of any type of product from any type of source node to any type of destination node.

A variety of shipping terms appear in the screens discussed below. These terms are defined in the following table.

Interface Data Field Glossary

Actual Arrival Date. The date on which a shipment actually arrived at a destination site.

Actual Arrival Time. The time in which a shipment actually arrived at a destination site.

Actual Ship Date. The date on which a shipment actually shipped from a supplier.

Actual Ship Quantity. The quantity of a specific purchase order item that the supplier actually shipped.

Actual Weight. The gross weight of a purchase order item on a shipment.

Arriving Now. A checkbox allowing a receiving location to indicate that a trailer has arrived.

BOL #. A unique identifier for a document that establishes the terms of a contract between the supplier and the carrier.

Carrier ID. A unique identifier assigned to a carrier company

Carrier Name. The name of a carrier company

Carrier Pro #. A unique carrier reference number generated for a shipment.

Confirmed Quantity. The quantity of a specific purchase order item that a supplier (e.g., at the source node) is expecting to ship.

Confirmed Ship Date. The ship date that a supplier is expecting a purchase order to be shipped. (Or the ship date on which the supplier has confirmed that a specific purchase order item will be shipped).

Description. A short description of the part item.

Expected Arrival Date. The date on which a specific purchase order item will arrive at a destination site.

Freight Pieces. The number of shipping devices necessary to package a confirmed quantity of a specific purchase order item.

Master BOLTR. A unique identifier for a document that establishes the terms of a contract between the supplier and the carrier, where two or more BOL have been consolidated into a single shipment.

Part. A reference code that identifies a part item, for example, as defined by the customer.

Priority. A designation given to a purchase order item (e.g., a part) to indicate urgency of delivery.

Requested Quantity. The quantity of a purchase order item that the customer is expecting to be shipped.

Requested Ship Date. The ship date that the customer is expecting a purchase order item to be shipped.

Shipment. A sequential number used to identify each recommended shipment generated.

Shipping Device. The device or container used to transport a purchase order item on a shipment. Shipping devices include: a box; a container, a pack; a pallet; a rack; and a mixed pallet.

Ship Quantity. The quantity of a specific purchase order item that the supplier actually shipped.

Ship To. The receiving location for a specific purchase order item.

SL#. A reference code assigned to a shipment.

Stackable. A Yes/No field which indicates whether a purchase order item is stackable.

Trailer Detail. A button which allows navigation to a Trailer Detail screen.

Trailer ID. A unique identifier for a trailer (i.e., Truckload or LTL shipment).

Trailer ID/SMPD ID. A unique identifier for a trailer (truckload shipment) or small package (LTL shipment).

Transportation Mode. The mode of a shipment. Possible modes include: TL (truckload), LTL (less than truckload), and SP (small package).

3(b). Source Node Screen Presentation

Figure 9A:
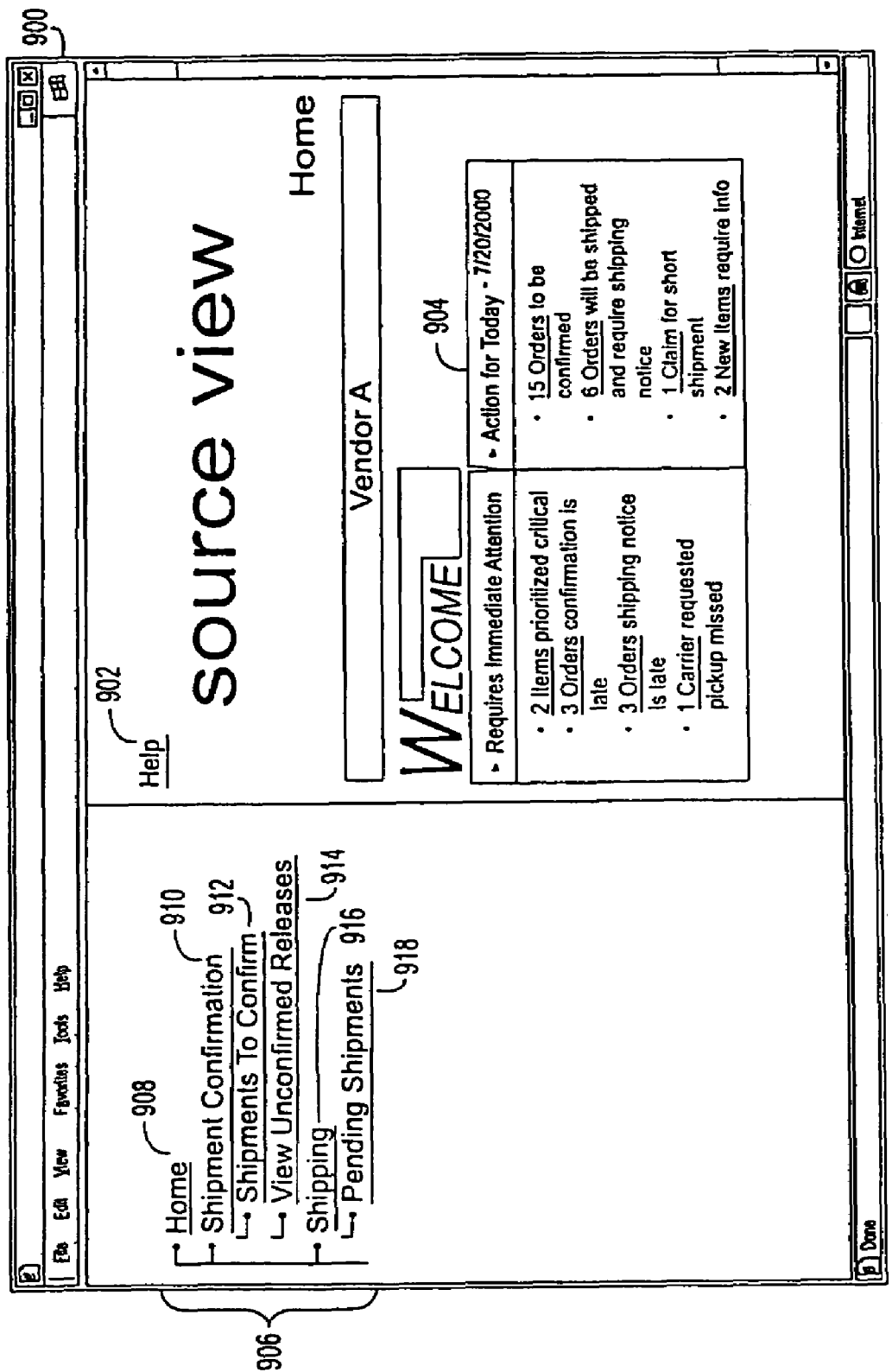

Once the logistics node 108 determines the user's node affiliation, it may display a Welcome screen. For instance, FIG. 9A shows a Welcome screen 900 appropriate for users affiliated with the source node 106. Users associated with the source node are typically product suppliers, and, in this particular case, a supplier identified as "Vendor A."

The Welcome screen 900 includes a menu 906 of functions that may be accessed by members associated with the source node 106. These functions include a "home" function 908 (for activating the Welcome screen 900 ), a "shipment confirmation" function 910, and a "shipping" function 916. The "shipment confirmation function" 910, in turn, includes a "shipments to confirm" function 912 and a "view unconfirmed releases" function 914. The "shipping" function 916 includes a "pending shipments" function 918. Each of these menu items may include hypertext links associated therewith. Accordingly, activating these functions (e.g., by pointing to and clicking on these functions with a mouse or like device in a conventional fashion) will call up one or more subscreens associated with these functions (discussed below).

The Welcome screen 900 also includes a window 904 containing a list of action items. The items are presented in left and rights fields. The left field of items identifies important (or critical) outstanding tasks, such as overdue confirmation orders and shipping notices, etc. The right field of items identifies other activities that should be completed within the course of the day. In general, entries in window 904 may include hypertext links. The user may activate subscreens associated with these action items by clicking on the links.

Finally, the Welcome menu may provide help information, such as a tutorial regarding the use of the interface. A user may activate the help information by clicking on a hypertext link associated with the "Help" text 902.

The functions identified in the menu 906 will now be discussed, starting with the "shipments to confirm" function 912. The "shipments to confirm" function 912 allows a user to confirm purchase orders (also know as "releases") within a limited period of time of the requested shipment date, such as two days from the shipment date. This function is activated by clicking on the "shipments to confirm" hypertext link 912.

Figure 9B:
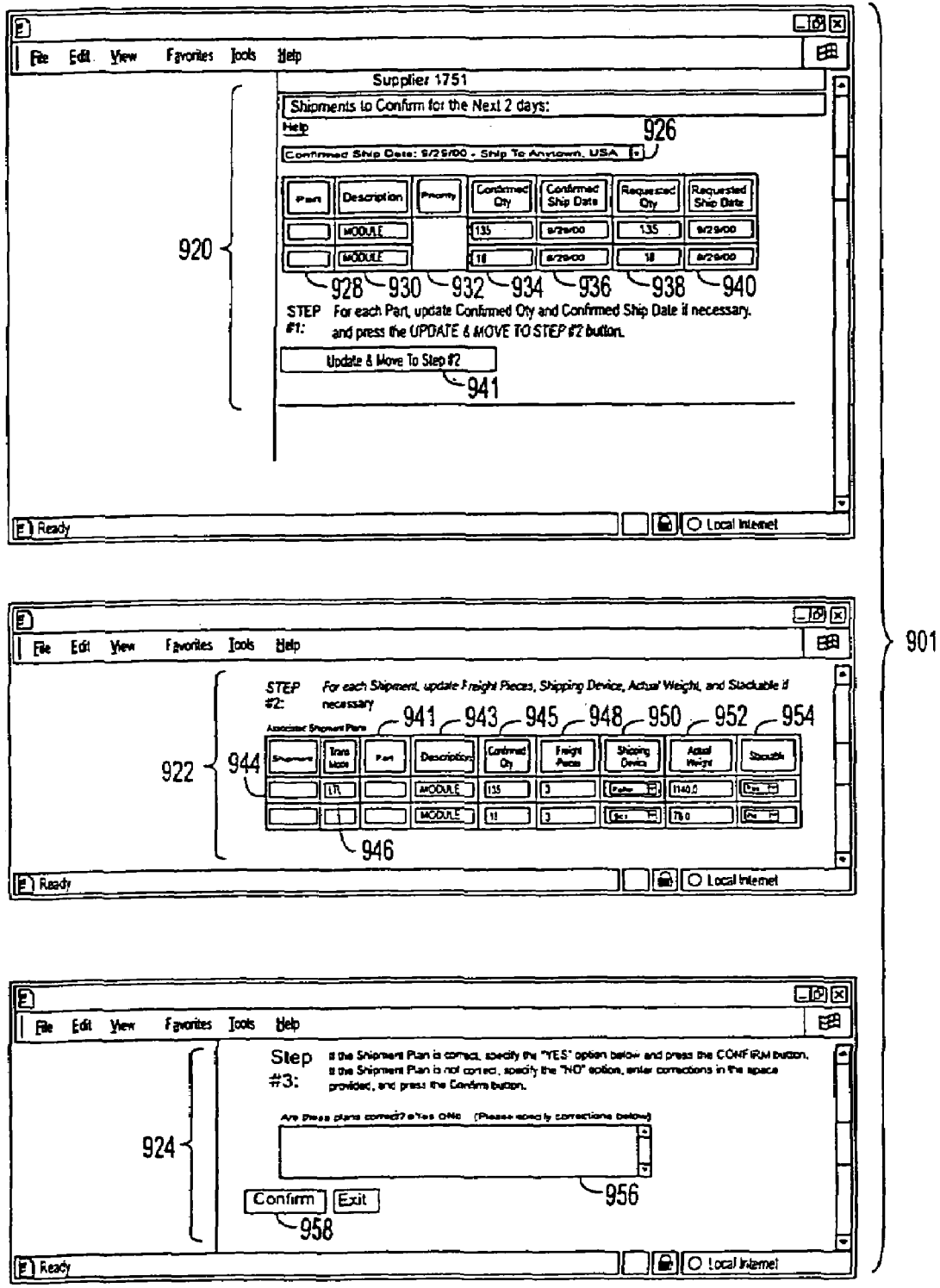

FIG. 9B shows different exemplary screen presentations 901 for performing the "shipments to confirm function" 912. A first screen 920 presents a confirmation work queue 926. This queue 926 comprises a drop down box that provides a "To Do" list of unconfirmed purchase orders that need to be confirmed for each "expected ship date/and ship to combination." The first screen 920 also presents a table that provides information concerning purchase orders, including a part identifier entry (in field 928), part description entry (in field 930), part priority entry (in field 932), confirmed quantity entry (in field 934), confirmed shipping date entry (in field 936), requested quantity entry (in field 938), and requested ship date entry (in field 940). In a first step, the interface instructs the user to update entries in the table as deemed necessary.

When the user has finished making updates, the interface instructs the user to click on an update icon 941. This prompts the system to generate a second table in screen 922. This table presents information regarding shipment plans that have been generated based upon the purchase order items confirmed in the first step. More specifically, the freight logic 318 (with reference to FIG. 3 and step 528 of FIG. 5) performs this function by evaluating each release item's priority, confirmed ship quantity, packaging information, and container information to determine the number of shipments required and the mode of transportation for each shipment. More specifically, the second table sets forth the plan by providing a shipment identification entry (in field 944), transportation mode entry (in field 946), part identifier entry (in field 941), description of the part entry (in field 943), confirmed quantity entry (in field 945), number of freight pieces entry (in field 948), shipping device entry (in field 950), actual weight of the product entry (in field 952), and an identification of whether or not the product is stackable entry (in field 954). In a second step, the interface instructs the user to update entries in the table as deemed necessary.

The interface then instructs the user to indicate whether the user approves of the system-generated shipment plan. For instance, the user may disagree with the shipment plan because it is believed to indicate too few/many shipments, an incorrect transportation mode, etc. If so, the user may click the "No" button in the third screen 924 to indicate disagreement with the plans. The interface will then place the interface's cursor in the text box 956, thereby allowing the user to enter a detailed description of the shipment plan changes that are believed to be necessary. When finished entering the shipment plan changes, the interface instructs the user to click on the confirm button 958 to confirm the shipment plan thus formed. Upon confirmation, the products are then shipped.

Another function identified by the menu is the "view unconfirmed releases" function 914. This may be activated by clicking on the hypertext link associated with this function. This function is useful when a user wishes to view unconfirmed purchase orders outside of the confirmation window (e.g., in the above example, outside the two-day window).

Figure 9C:
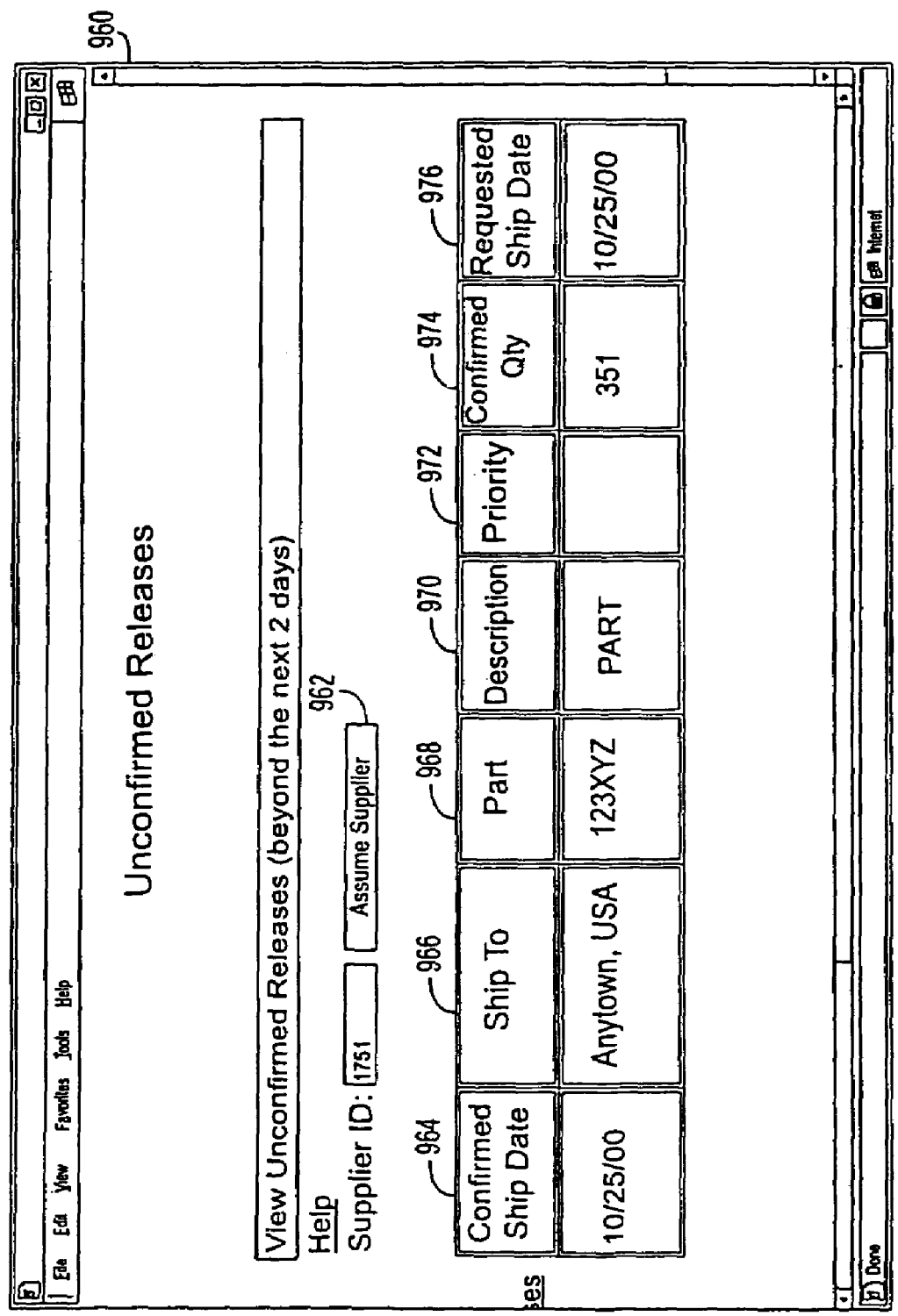

FIG. 9C shows an exemplary screen 960 for performing the "view unconfirmed releases" function 914. This screen prompts the user to enter an identification number corresponding to a particular supplier (i.e., source) and then press the "assume supplier" icon 962 to activate a table giving purchase order items associated with the identified supplier. This table specifically includes a confirmed ship date entry (in field 964), "ship to" location entry (in field 966), part number entry (in field 968), part description entry (in field 970), priority entry (in field 972), confirmed quantity entry (in field 974), and requested ship date entry (in field 976).

In this embodiment, the interface does not allow the user to confirm purchase orders listed in the "view unconfirmed release" screen. This screen is nevertheless useful because it allows a supplier to more effectively plan for upcoming events. This screen also gives the supplier an opportunity to timely notify the customer node 104 when the supplier anticipates that it will not be able to fill a particular order.

Another function identified by the menu 906 is the "view pending shipments" function 918. This function is used to view pending shipments that have already been confirmed. This may be activated by clicking on the hypertext link associated with this function.

Figure 9D:
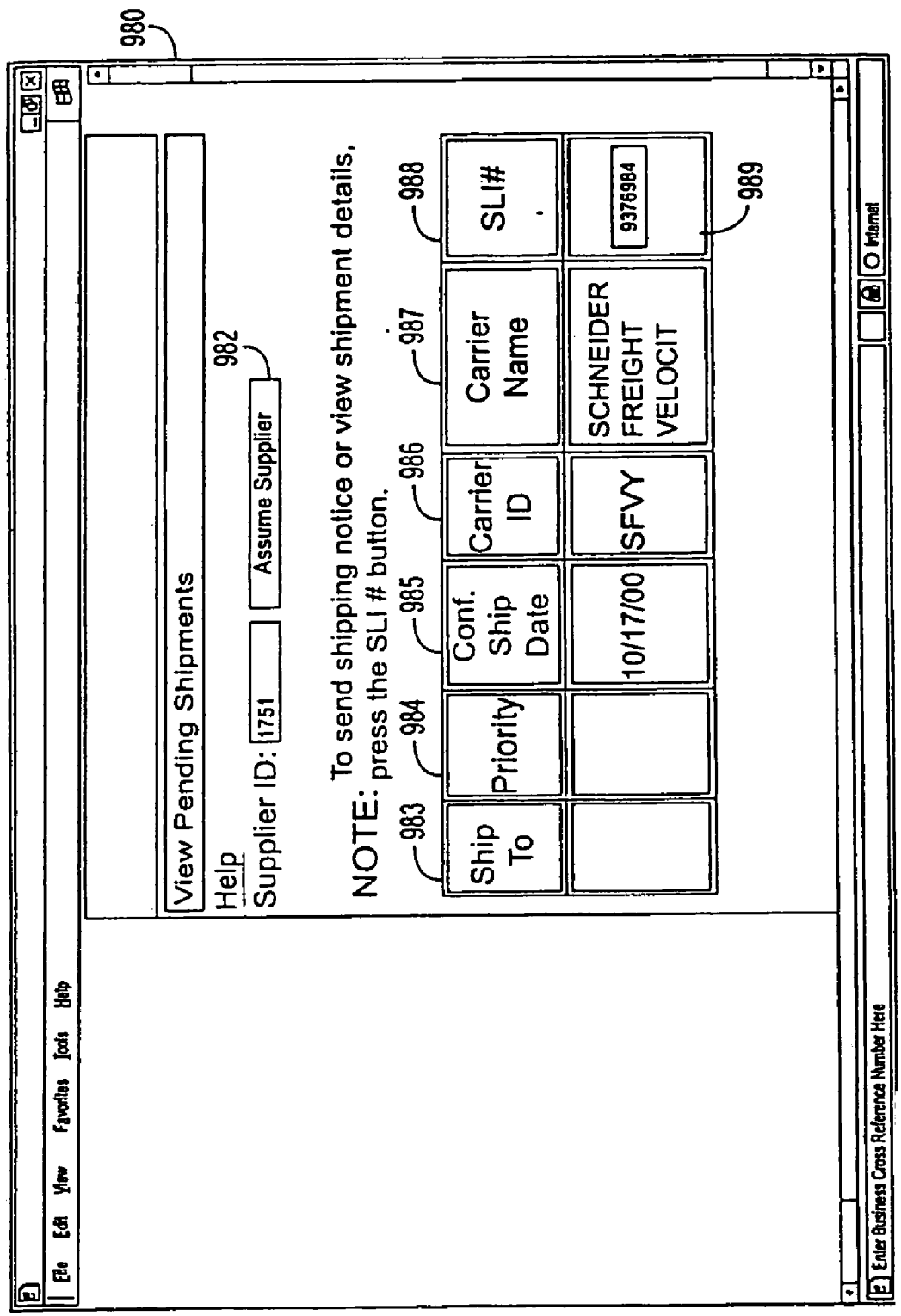

FIG. 9D shows an exemplary screen 980 for performing the "view pending shipments" function 918. More specifically, as is in the case of the screen 960 shown in FIG. 9C, this screen 980 prompts the user to enter an identification number corresponding to a particular supplier, and then click on the "assume supplier" icon 982 to activate a table providing confirmed purchase order information pertaining to the identified supplier. More specifically, the interface displays the shipments that were confirmed for the identified supplier using the "shipments to confirm" function discussed above.

The table shown in screen 980 contains a "ship to" entry (in field 983), a priority entry (in field 984), a confirmation ship date (in field 985), a carrier identification number field (in field 986), a carrier name entry (in field 987) and an SLI number used to identify the shipment (in field 988). More specifically, the SLI number defines an identification code assigned by the logistics node 108 to represent a particular shipment. The interface displays a message "No Carrier Assigned" if the logistics node has not assigned a carrier. The interface will display a message "Re-plan Needed" when the shipment requires re-planning by the logistics node 146.

The supplier may further use screen 980 to send a shipping notice. More specifically, the supplier typically performs this task shortly after making a shipment. To perform this task, a user clicks on the button 989, which bears the SLI number of the shipment. This action activates the "send shipping notice screen" 990 shown in FIG. 9E. The purpose of this screen is also to identify whether (and how) the actual shipment diverged from the planned shipment.

Field 991 of the "send shipping notice" screen 990 identifies top-level information concerning the shipment. Namely this field identifies the SLI# of the shipment, a carrier identification number ("Carrier D"), a carrier name, a confirmed shipment date, a "ship to" destination, a transportation mode, a master BOL number (defining a unique identifier for a document that establishes the terms of a contract between the supplier and the carrier, where two or more BOL numbers have been consolidated into a single shipment), a carrier Pro number (a unique carrier reference number generated for the shipment), an actual shipment date, and a Trailer/SMPK identifier.

Screen 990 further lists each of the products transported in a particular shipment. Namely, the illustrated table identifies a part entry (in field 992), a part description entry (in field 993), a party priority entry (in field 994), a confirmed quantity entry (in field 996), and a bill of lading (BOL #) entry (in field 997). The shipment identified in FIG. 9E contains only one item. However, other shipments will contain plural items, and, accordingly, the table would display these plural items.

If the displayed information is correct, the user may instruct the interface to transmit a shipping notice by activating icon 999. If the user determines that the shipment plan is not correct, the user may make corrections in field 998 of this screen.

3(c). Destination Node Screen Presentation

Figure 10A:
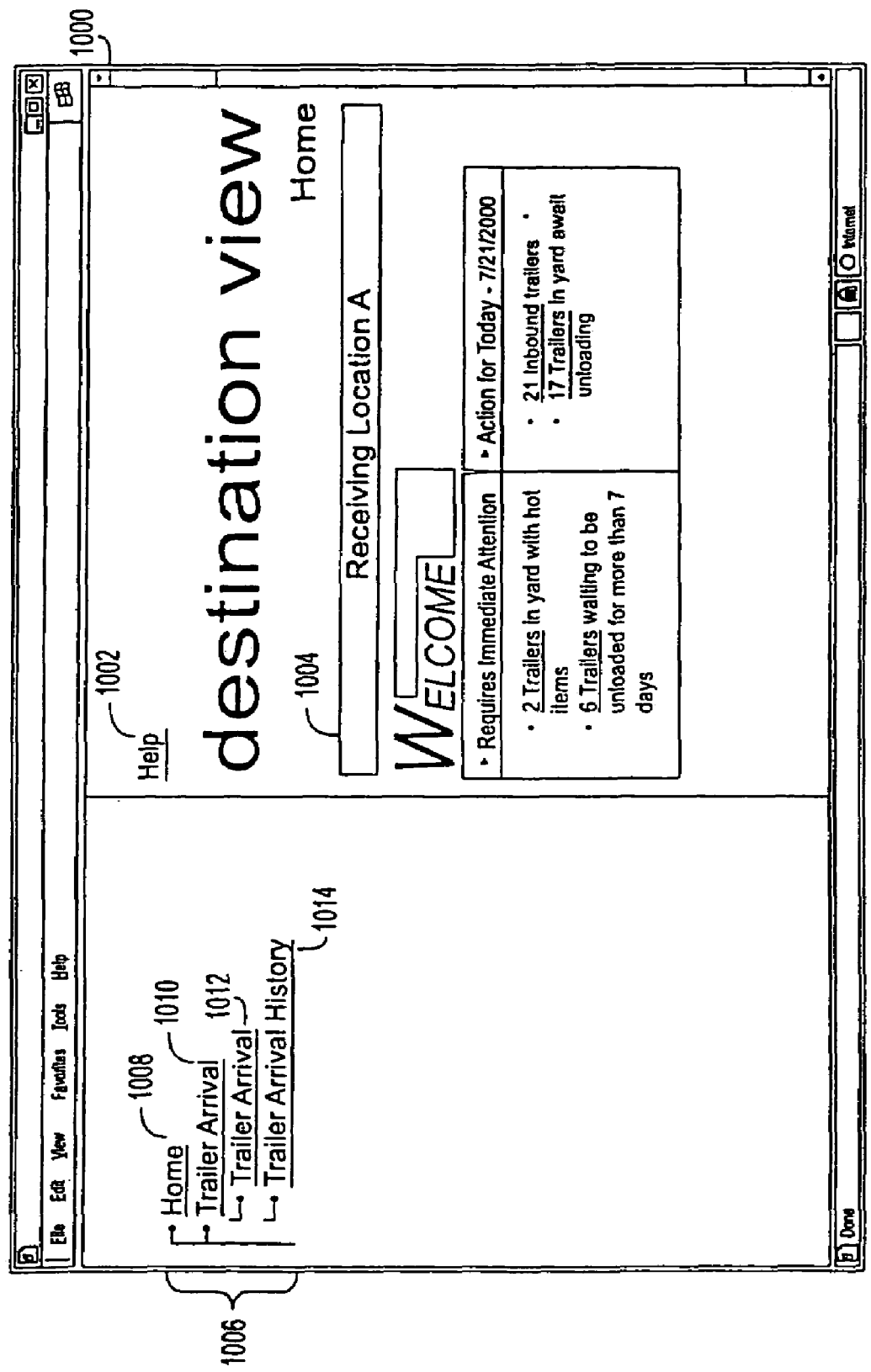
FIGS. 10A-10E show an exemplary series of screens appropriate to a user affiliated with the destination node.

FIG. 10A shows a Welcome screen 1000 appropriate for users affiliated with the destination node 102. Users associated with the destination node are typically recipients of products, such as manufacturing plants. In this particular case, the interface indicates that the user that has logged onto the work station is associated with a "Receiving Location A."

The Welcome screen 1000 includes a menu 1006 of functions that may be accessed by members associated with the destination node 102. These functions include a "home" function 1008 (for activating the Welcome screen 900), and a "trailer arrival" function 1010. The "trailer arrival" function 1010, in turn, includes a "trailer arrival" function 1012 and a "trailer arrival history" function 1014. Each of these menu items may include hypertext links associated therewith. Activating these links (e.g., by pointing to and clicking on these links with a mouse or like device in a conventional fashion) will call up one or more subscreens associated with the identified functions (discussed below).

The Welcome screen 900 also includes a window 1004 containing a list of action items. The items are presented in left and rights fields. The left field of items identifies important (or critical) outstanding tasks. In the present case, for instance, the window 1004 identifies that there are two trailers in the shipping yard having high priority items, and that six trailers are waiting to be unloaded for more than seven days. The right field of items identifies other activities that should be completed within the course of the day. In general, entries in window 904 may include hypertext links. The user may activate subscreens associated with these action items by clicking on the links.

The Welcome menu may provide help information, such as a tutorial regarding the use of the interface. A user may activate this help information by clicking on a hypertext link associated with the "Help" text 1002.

The functions identified in the menu 1006 will now be discussed, starting with the "trailer arrival" function 1012. Activating this function calls up a screen 1016 shown in FIG. 10B. This screen allows the user to view inbound shipments currently in transit. More specifically, this screen first prompts the user to enter a code designating a destination site, and then click on the icon 1018. This provides a list of transit trailers scheduled to arrive at the destination site on that current date. The user may examine transit trailers scheduled to arrive on future dates by activating the next date icon 1020.

Screen 1016 presents a table that identifies information regarding the arriving shipments. A first field 1021 in that table identifies whether the trailer is "arriving now." A user may manually record the arrival of a trailer by locating the appropriate trailer entry in the table, checking the box in the "arriving now" field 1021, and then clicking the update icon 1019. This will automatically populate the "actual arrival date" field 1027 and "actual arrival time" field 1028 in the table with the current date and time. However, a user should manually enter these fields of information in the event that there is a significant delay from the time that a trailer arrives at the destination site to the time a user records its arrival via the interface screen 1016.

Other fields in the table include an expected arrival date entry (in field 1022), carrier name and identification number entry (field 1023), a trailer identification number entry (in field 1024), a master BOL# entry (in field 1025), a priority entry (in field 1026), and a trailer detail entry (in field 1029). The logistics node 108 may select the priority level to reflect the purchase order item in the shipment having the highest priority.

The priority information is particularly useful to participants in the shipping chain. In one exemplary embodiment, the table lists the priority level of the highest priority item within the shipment. This feature quickly reveals loads that may warrant expedited processing to ensure their timely delivery.

Figure 10B:
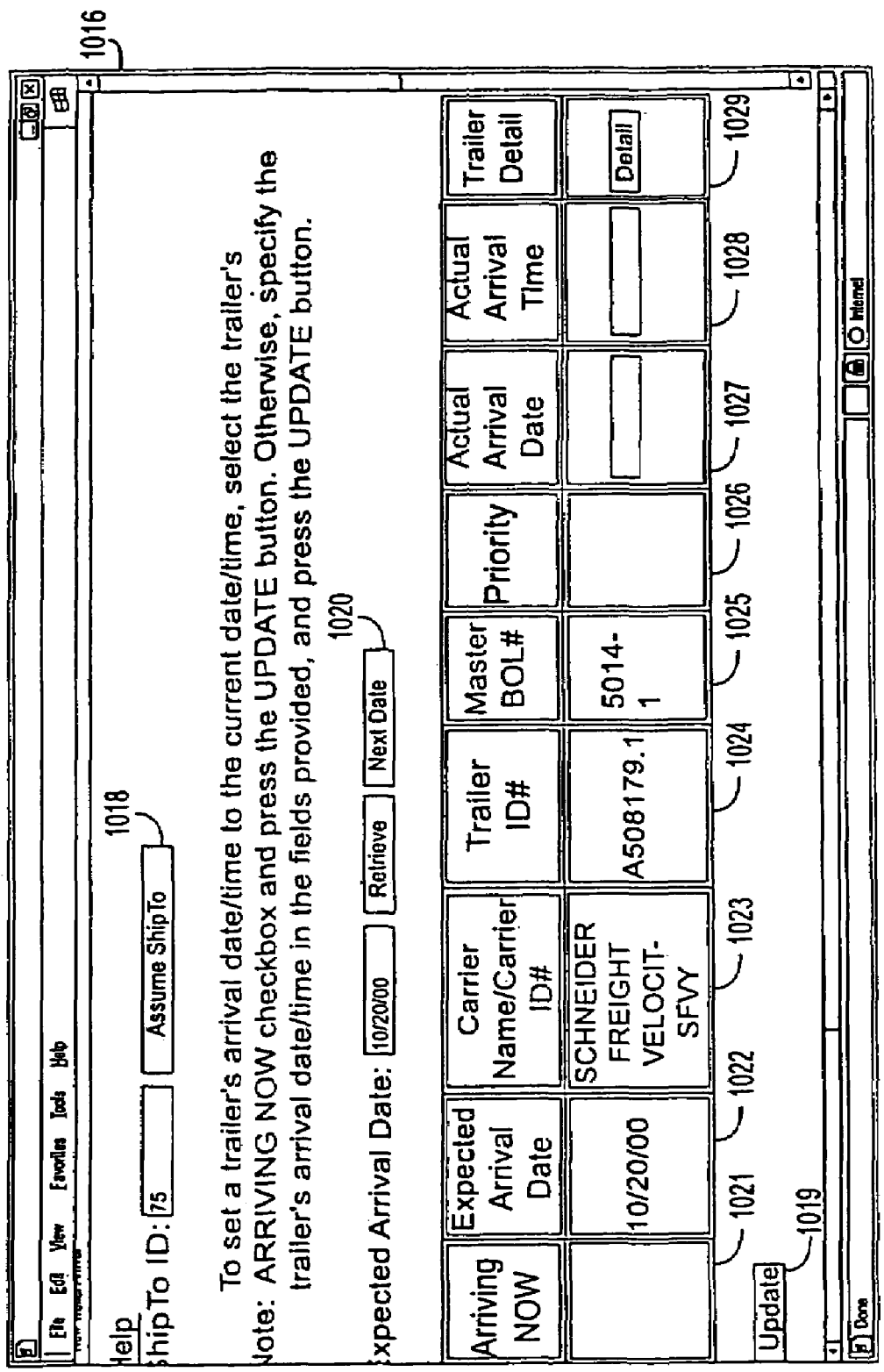
Figure 10C:
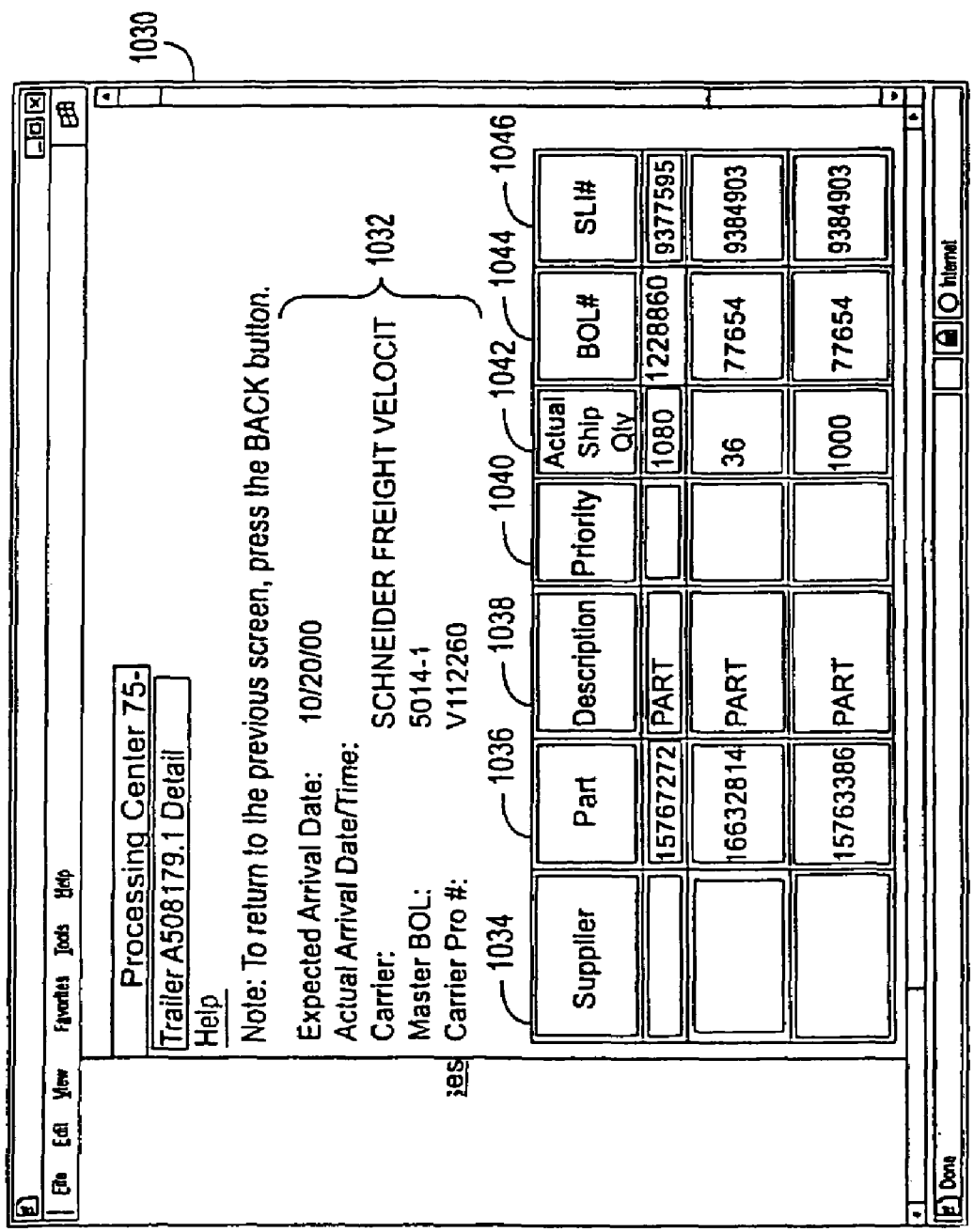
Figure 10D:
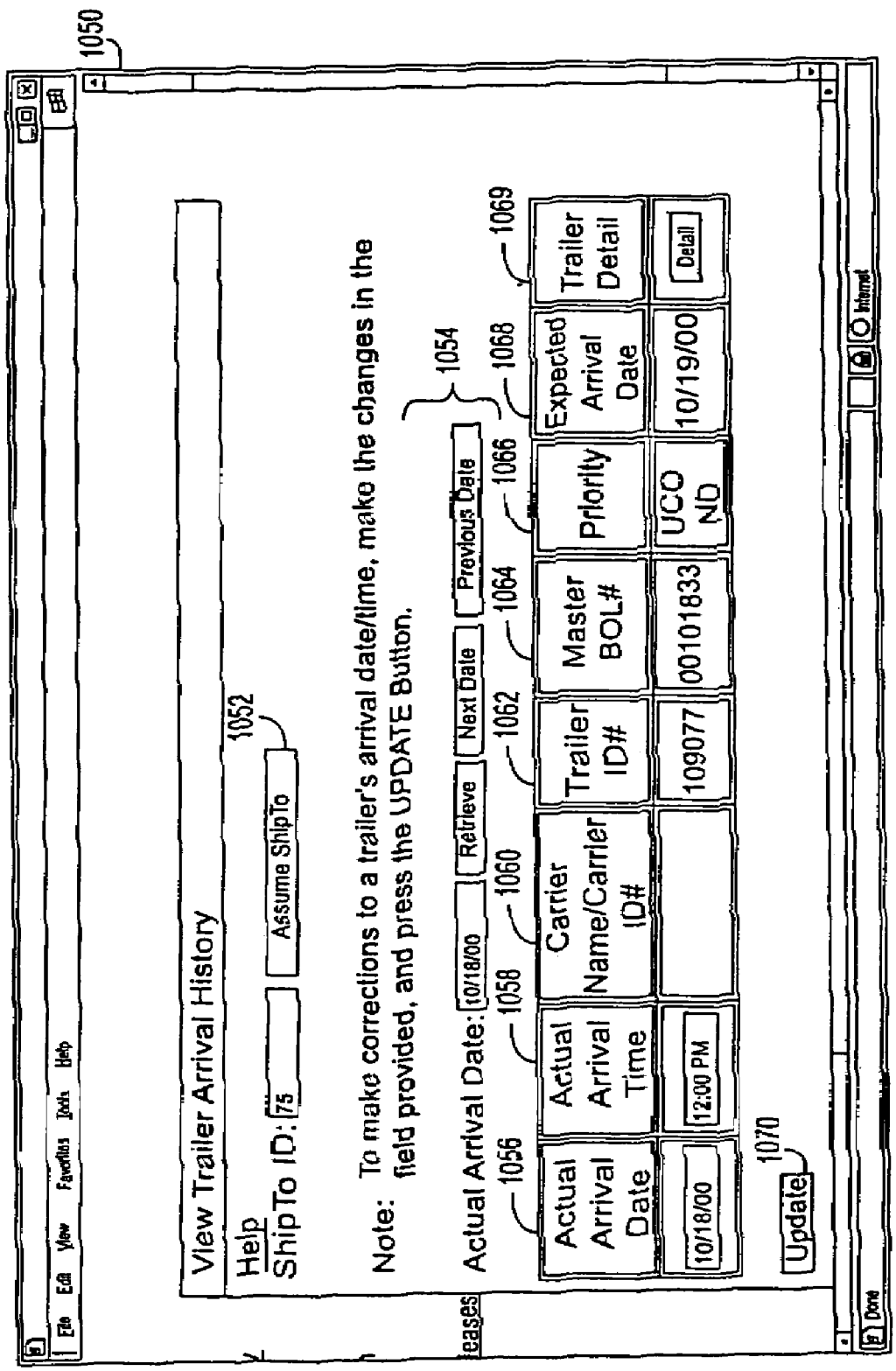
Figure 10E:
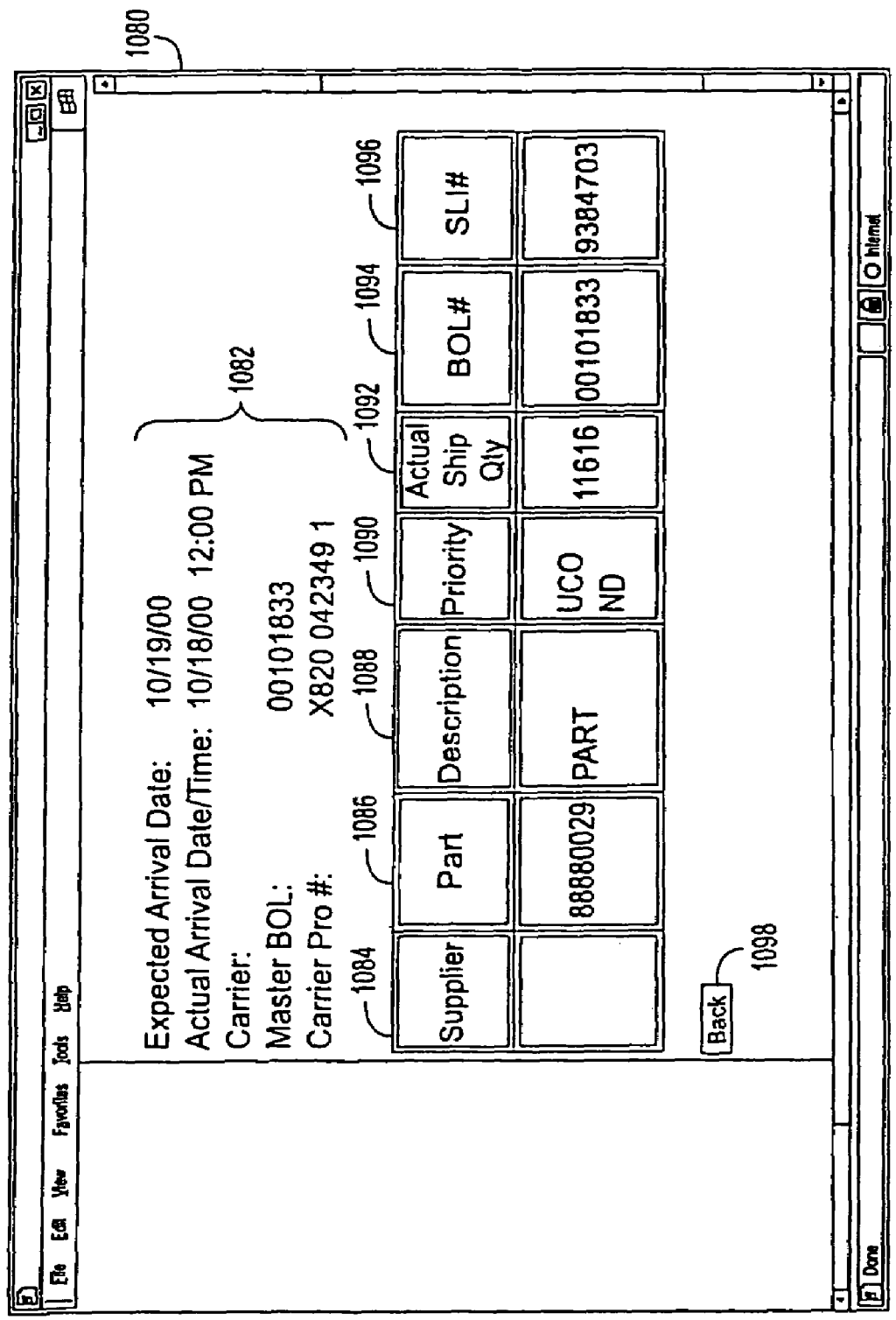

By clicking on the detail icon 1029 in the trailer detail field, the interface presents screen 1030 shown in FIG. 10C. This screen 1030 allows a receiving location to view detailed information pertaining to an inbound shipment. More specifically, this screen 1030 includes a general field 1032 providing high-level information concerning the shipment, including its expected arrival date, the actual arrival date and time, the name of the carrier, the master bill of lading (BOL) for the carrier, and a carrier Pro number (a unique carrier reference number generated for a shipment).

This screen 11030 also provides a table that identifies the detailed contents of the load. The table specifically includes a part supplier entry (in field 1034), a part entry (in field 1036), a description of the part (in field 1038), priority (in field 1040), an actual shipment quantity entry (in field 10420), a bill of lading number (in field 1044), and an SLI number (in field 1046).

The destination view interface may further permit a user to input any identifying number (e.g., part number, SLI number, trailer identification number, etc.) and receive information associated with that number. For instance, a user could input a part number to locate trailer that current is carrying that part. Alternatively, the user may enter an SLI number or truckload identification number to examine the individual items contained in these shipments. Further, after receiving a response to an initial query, the user may "zoom in" on the retrieved information to retrieve yet further detailed information regarding the shipment, or "zoom out" on the retrieved information to retrieve more general information regarding the shipment. The logistics node permits a user to retrieve information in this fashion by storing associative links between different hierarchies of shipping information (e.g., in a relational database format, or other associative format).

The above features allow users involved in the distribution chain to track the status of the shipments without having to enter tracking codes that are unique to individual carriers. That is, users can determine the status of a shipment by entering various information pertaining the shipment, but without having to specifically identify the carrier that is handling the shipment.

The second function in the destination view interface, i.e., the "trailer arrival history" function 1014, can be accessed by clicking on that function the menu of functions 1006. This activates the screen 1050 shown in FIG. 10D.

Screen 1050 resembles the screen 1016 shown in FIG. 10B. For instance, it allows the user to specify a destination site by entering a destination code and clicking on icon 1052. It further allows the user to enter an actual arrival date in field 1054 to access trailer arrival information for a specific date. But this interface feature differs from the corresponding feature in FIG. 10B by also allowing the user to access trailer arrival information for previous dates.

Screen 1050 displays a table having much of the same information presented by in the table of FIG. 10B, including fields 1056, 1058, 1060, 1062, 1064, 1066, 1068, 1069 and 1070 identifying the entries discussed in the context of FIG. 10B. Activating the detail icon in field 1069 prompts the interface to generate screen 1080 shown in FIG. 10E. Again the information presented in this screen (including fields 1082, 1084, 1086, 1088, 1090, 1092, 1094, 1096 and 1098) has been generally discussed in the context of FIG. 10C.

4(d). Customer Node Screen Presentations

Figure 11A:
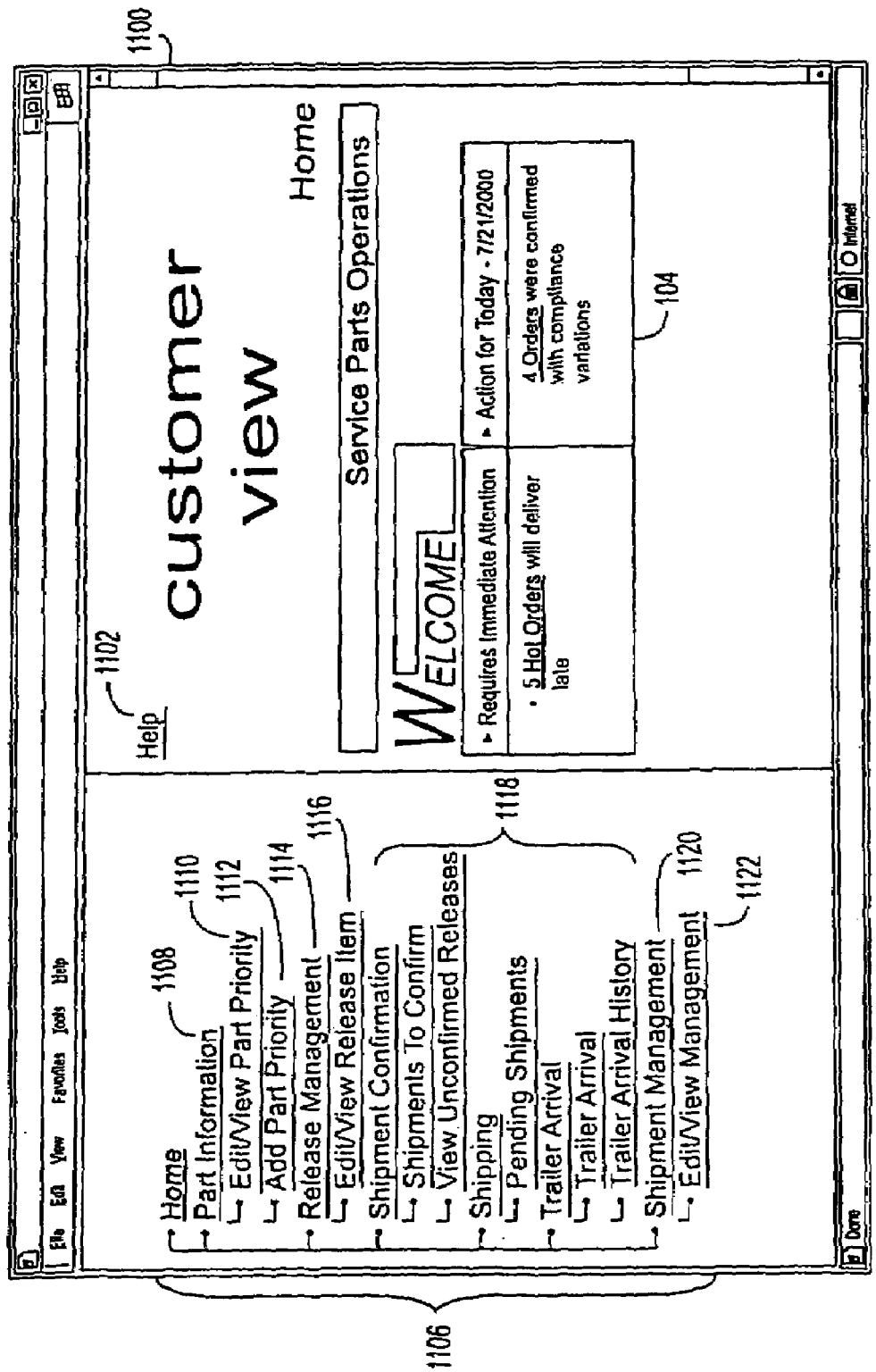
FIGS. 11A-11C show an exemplary series of screens appropriate to a user affiliated with the customer node.
Figure 11B:
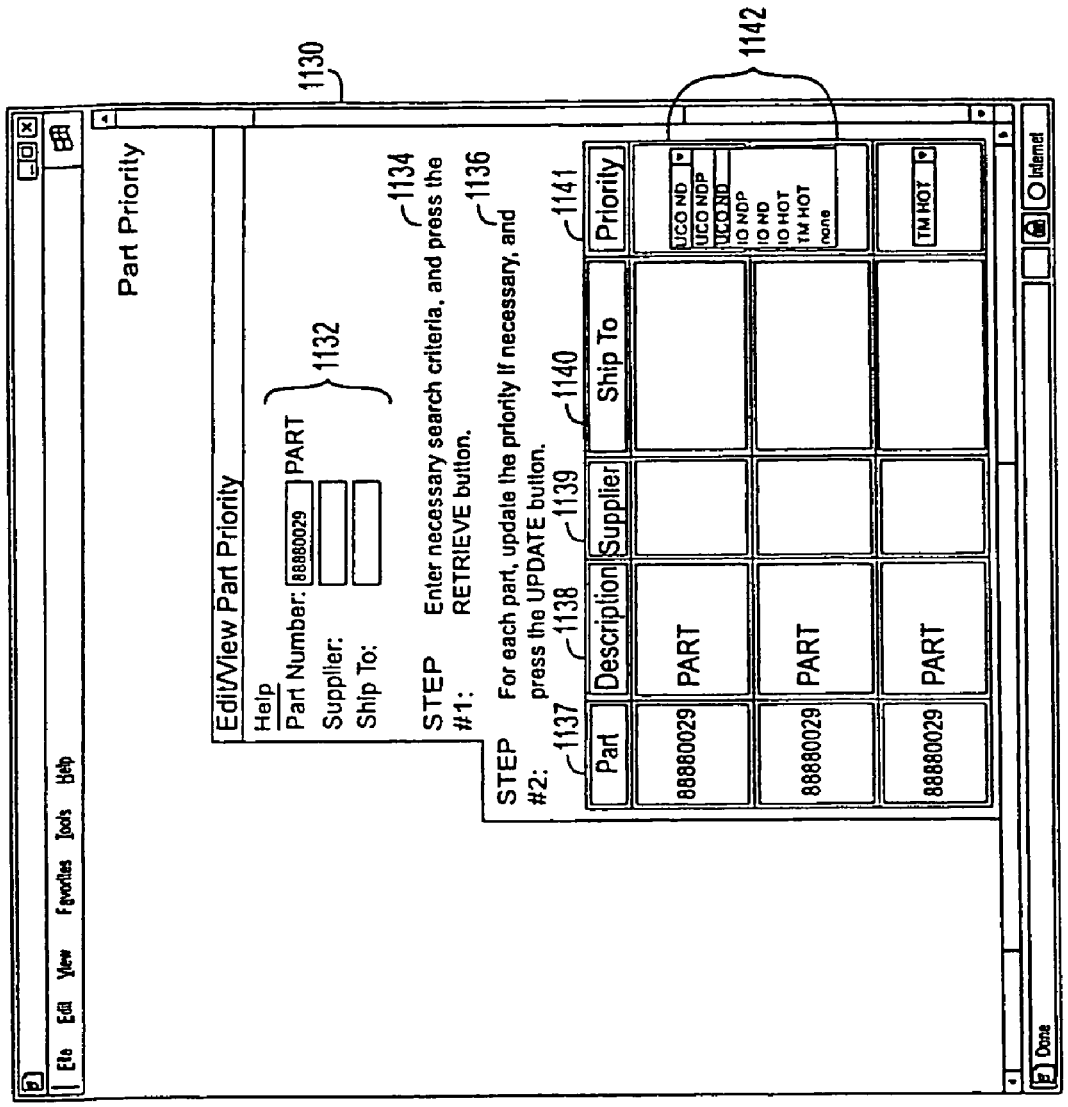
Figure 11C:
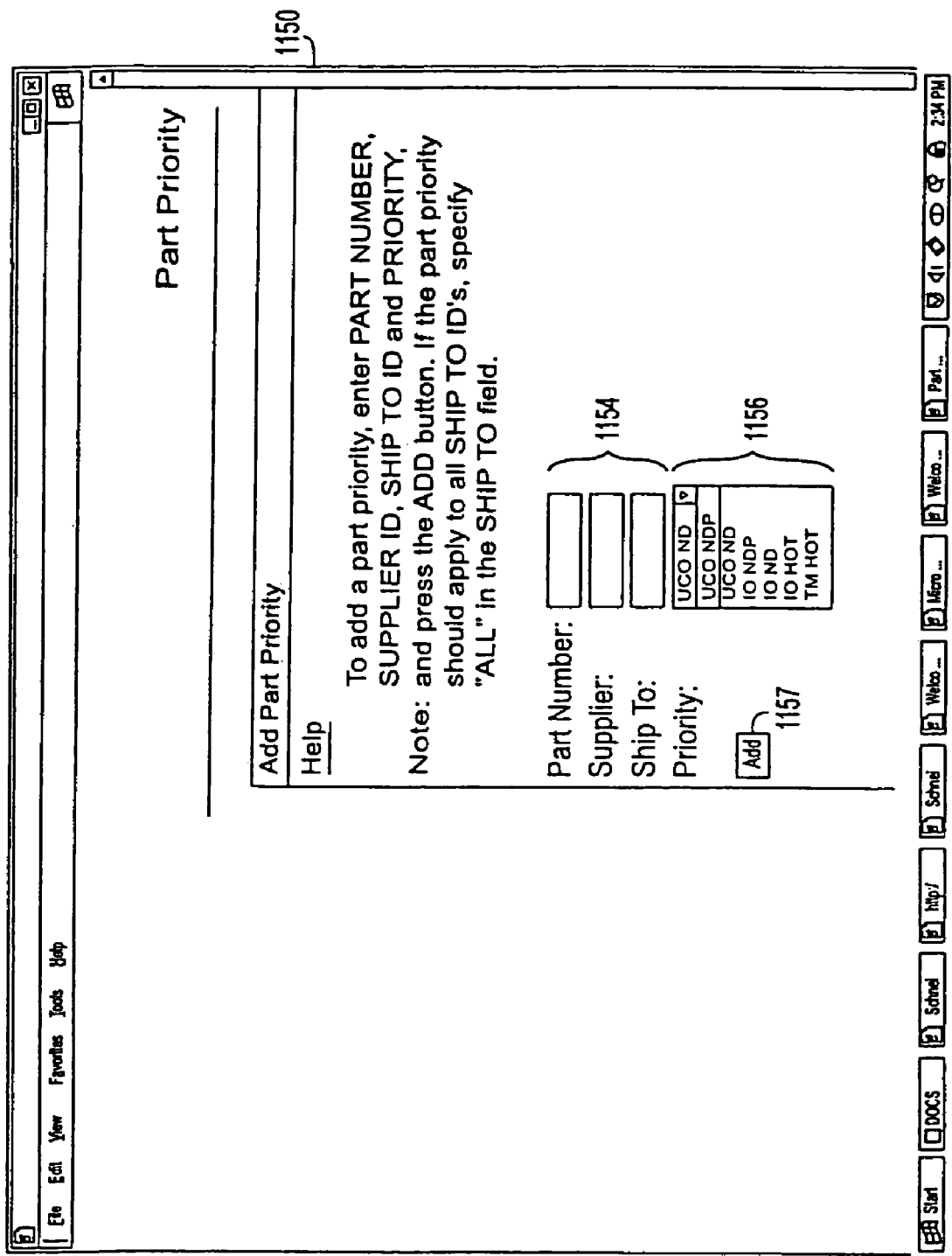

FIG. 11A shows a Welcome screen 1100 appropriate for users affiliated with the customer node 104. Users associated with the customer node 104 are typically the parties that command the transfer of products from the source node 106 to the destination node 102 to accomplish some business objective (such as the manufacture of items for retail sale, such as cars, etc.). In this particular case, the interface indicates that the user that has logged onto the work station is associated with a service parts operation unit, e.g., within a manufacturing company.

Welcome screen 1100 includes a menu 1106 of functions that may be accessed by members associated with the customer node 104. These functions include a "home" function, a "parts information" function 1108, a "release management" function 1114 and a "shipment management" function 1120. The "part information" function 1108, in turn, includes an "edit/view party priority" function 1110, and an "add part priority" function 112. The "release management" function includes an "edit/view release function" 1116. The "shipment management" function 1120 includes an "edit/view shipment" function 1122. Each of these menu items may include hypertext links associated therewith. Accordingly, activating these functions (e.g., by pointing to and clicking on these functions with a mouse or like device in a conventional fashion) will call up one or more subscreens associated with these functions (discussed below).

The menu 1106 also includes a number of previously-discussed functions 1118. Namely, the "shipment confirmation" and "shipping" functions were discussed above in the context of the source view interface. The "trailer arrival" function was discussed above in the context of the destination view interface.

The Welcome screen 1100 also includes a window 1104 containing a list of action items. The layout and function of this window parallels the welcome-windows previously discussed (e.g. in connection with the source and destination view interfaces). Screen 1100 also includes a "Help" link 1102 that functions in the same manner discussed above.

The functions identified in the menu 1106 will now be discussed, starting with the "edit/view part priority" function 1108. Activating this function calls up a screen 1130 that allows the user to view part priority information and make changes thereto. This function is not shared by the source and destination nodes because, in this particular application, the customer node does not wish to empower these nodes to make such changes. In an alternative embodiment, the system may be configured to allow the source and destination nodes to make priority changes.

The screen 1130 allows the user to call up part information by specifying the part number, supplier information, and/or "ship to" (destination) information. This information is entered into field 1132 of the screen, as instructed by prompt 1134. Entry of the above-identified part information prompts the interface to display yet another table. This table has lists a part number entry (in field 1137), a part description (in field 1138), a supplier entry (in field 1139), and a "ship to" location (in field 1140).

The priority field 1141 of the table contains a pull down menu 1142. The pull down menu 1142 provides a list of priority levels appropriate to a particular shipping environment. The lowest entry corresponds to the least critical priority status. The topmost entry corresponds to the most critical priority status. The user may change the priority of any part by activating the pull down menu 1142 and selecting a different priority code than what was originally displayed in field 1141. This changes the urgency attached to the delivery of the associated part. The change in the priority level is also reflected on the interfaces accessible to other nodes throughout the distribution chain. Accordingly, changing the priority level here has the effect of substantially instantaneously notifying all parties of changes in priority.

Function 1112 performs a similar task to function 1110. More specifically, activating function 1112 calls up screen 1150 shown in FIG. 11C. Screen 1150 contains an input field 1154 for specifying a part number (or collection of part numbers). The priority of these part numbers is specified using pull down menu 1156 in a manner similar to that described above in connection with FIG. 11B. The user formally commands the system to record the entered priority status by activating the "add icon" 1157.

The other functions (i.e., the "edit/view release item" function 1116 and the "edit/view shipment" function 1122) allow the customer to view and edit purchase order information and shipment information, respectively.

4(e). Logistics Node Screen Presentations

Figure 12A:
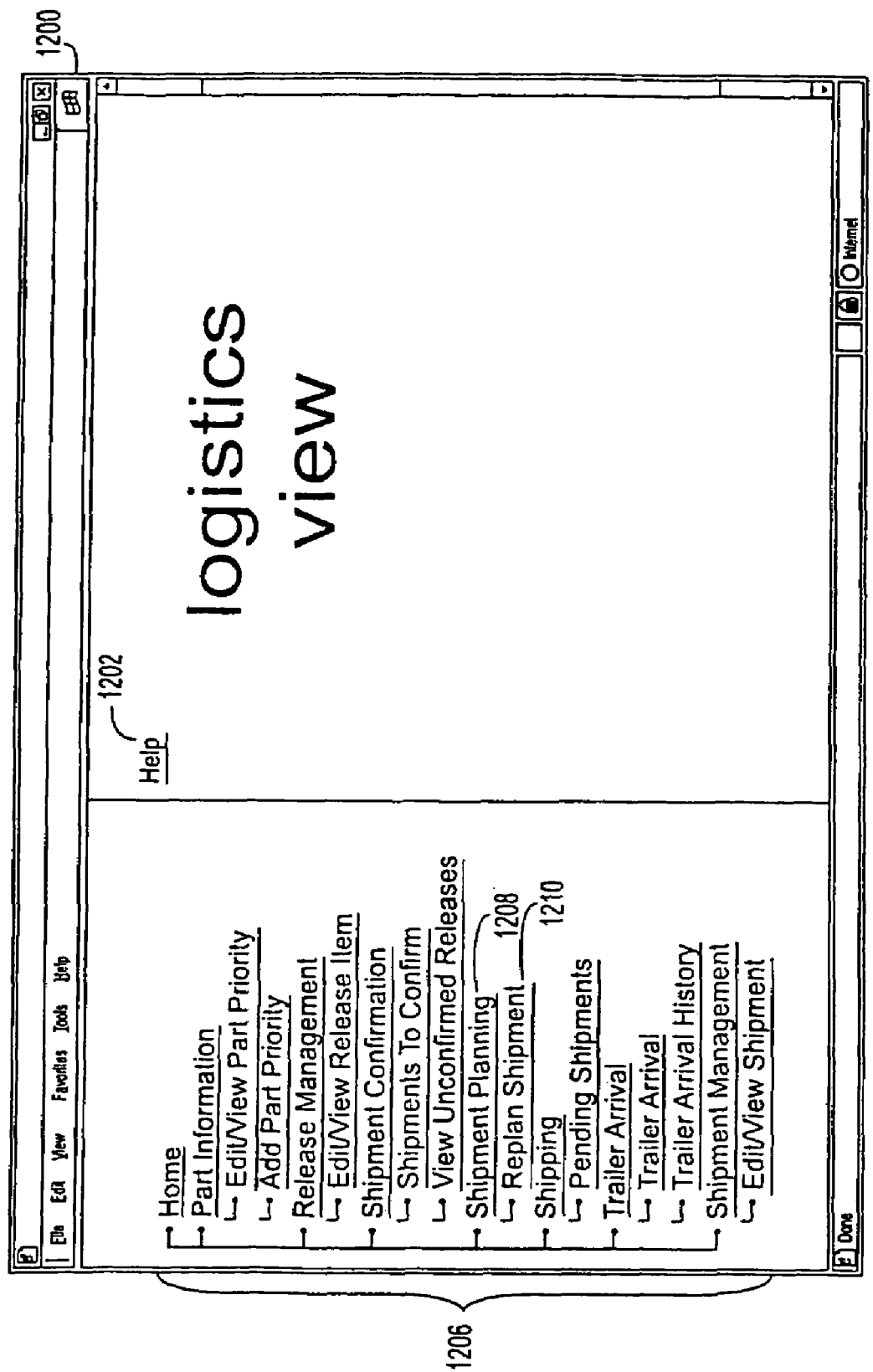
FIGS. 12A and 12B show an exemplary series of screens appropriate to a user affiliated with the logistics node.

FIG. 12A shows a Welcome screen 1200 appropriate for users affiliated with the logistics node 108. Users associated with the logistics node 108 are typically the parties that administer the shipping process. This Welcome screen 1200 includes a menu 1206 of functions that may be accessed by members associated with the logistics node 108. These functions include every function discussed so far, plus a "shipment planning" function 1208, which, in turn, includes a "replan shipment" function 1210. Each of the menu items may include hypertext links associated therewith. Accordingly, activating these functions (e.g., by pointing to and clicking on these functions with a mouse or like device in a conventional fashion) calls up one or more subscreens associated with these functions (discussed below).

Figure 12B:
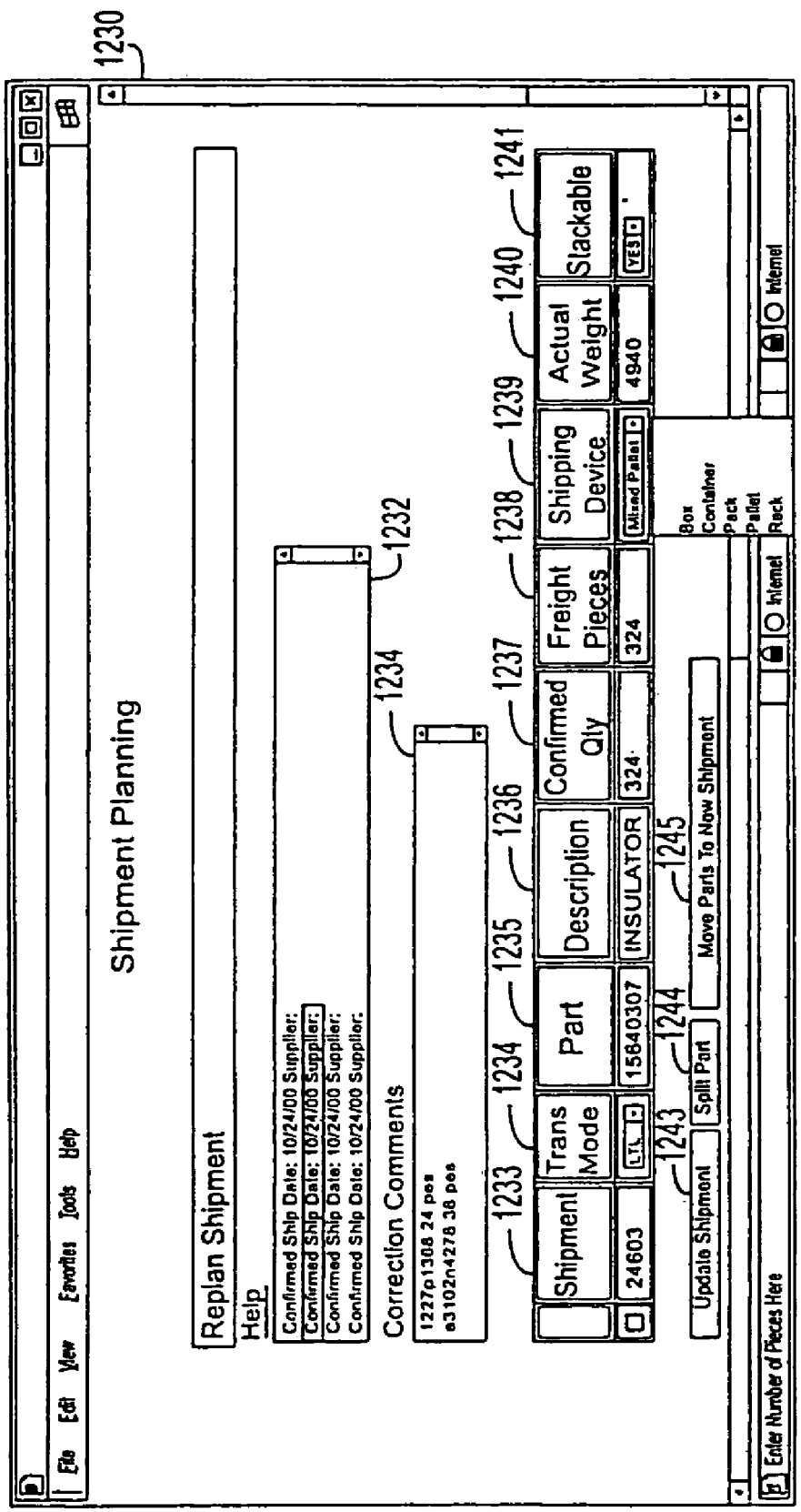

Activating the shipment planning function 1210 shown in FIG. 12A causes the display of the shipment planning screen 1230 shown in FIG. 12B. This screen is used to make changes to the shipping plan. Shipment planning may be appropriate when an initial plan encounters some type of difficulty (or the supplier objects to the plan).

More specifically, this screen identifies a queue of shipments in field 1232 that require replanning. The user may select a particular entry) in this list, whereupon that entry is displayed in the table shown at the bottom of the screen. The table includes fields 1233, 1234, 1235, 1236, 1237, 1238, 1239, 1240 and 1241 that generally correspond to the identically labeled fields shown in FIG. 9B (i.e., in screen 922 of that figure). The user may make changes to the above-identified fields to attempt to resolve the problems with the plan. Alternatively, the user may activate the "split no part" icon 1244 to break up the shipment into plural part, or the "move parts to new shipment" icon 1245 to transfer parts to a new shipment. When finished, the user may activate the "update shipment" icon 1243 to affect formal changes to the shipment's scheduling plan.

In an alternative embodiment, the system may automate the above-described replanning operations. This can be performed by storing a list of rules which capture the decision-making process used by human operators (thereby forming a knowledge base of planning rules), and then accessing and utilizing these rules to resolve the planning conflicts.

4. Variations

As should be apparent from the above discussion, the present technique generates a great quantity of information concerning shipping events, and furthermore maintains associative links to reflect the relationships between different fields of information. This information may be maintained in database 308 of the logistics node's central station. The immediate use of the above-identified data is to provide status information to participants in the distribution chain (e.g., suppliers, corporate customers, processing centers, carriers, etc.). Exemplary alternative uses for the above-identified information are identified below.

For instance, logic can be incorporated in the system 100 for generating interactive reports. The reports can be accessed by customers via a Web browser to interactively (e.g., using a point an click approach) to specify the pieces of information they wish to access and view. Further, the linking of information allows the user to "zoom in" to get progressively more specific detailed information regarding a shipping-related topic, or "zoom out" to get progressively more general information regarding a shipping-related topic. The specific application identified above, for instance, allows a user to "zoom in" to determine details regarding the individual items within a load, or to "zoom out" to get more general information regarding the load as a whole.

Logic can be incorporated in the system 100 to support ad-hoc queries by customers (e.g., free form queries). Additional logic may be incorporated to create customized reports over the Internet that are tailored to the needs of individual customers.

Logic can be incorporated in the system 100 to support multidimensional analysis. This offers the ability to rapidly view historical trends in the shipping data from many different perspectives. For instance, customers can investigate the root cause of shipping inefficiencies by navigating through the linked information provided in the database to uncover the source of the problem. Further, logic may be incorporated in the logistics node 108 to highlight data that exceeds a predefined threshold or varies significantly from historical trends. This facilitates the user's decision making process.

Logic can be incorporated in the system 100 to support data mining combs through customer's data, to locate patterns in a series of past transactions, and to make one or more recommendations based on these findings.

Logic can be incorporated in the system 100 to capture historical transportation information for every part/product. On the basis of this data, customers will be able to determine the average transit times for each product from origin to destination by mode. The customers may use this information to make their supply chains more efficient and reduce inventory.

Logic can be incorporated in the system 100 for measuring supplier performance criteria. For instance, customers can determine the percentage of requested parts/products that a supplier sent in the first shipment. Further, suppliers can determine how long it takes to deliver parts/products after placing an order.

Logic can be incorporated in the system 100 that permits customers to measure supplier performance criteria. For instance, the system may provide performance data pertaining to timeliness, etc.

Logic can be incorporated in the system 100 for capturing financial information for transportation-related costs. For instance, the system 100 may provide historical carrier rates to compare against benchmarks.

Other modifications to the embodiments described above can be made without departing from the spirit and scope of the invention, as is intended to be encompassed by the following claims and their legal equivalents.

What is claimed is:

1. A logistics node for administering the shipment of a product from a source node to a destination node, comprising:
    an interface unit for coupling the logistics node with at least one remote entity;
    a processing unit coupled to the interface unit for controlling the operation of the logistics node;
    a database coupled to the processing unit for storing information pertaining to the shipment of a product from the source node to the destination node;
    logic for providing a user with an option to examine shipment information using first and second levels of detail, wherein the second level of detail is more refined compared to the first level of detail;
        wherein the first level of detail provides information concerning a shipment load, and the second level of detail provides information pertaining to an individual product on the shipment load;
    logic for allowing a user to select the first or second level of detail; and
    logic for providing shipping information to the user corresponding to the selected level of detail.

2. A method for administering the shipment of a product from a source node to a destination node, comprising:
    providing a freight management tool to a user;
    providing the user an interface with which to interact with the freight management tool;
    providing the user with an option to examine shipment information using a first level of detail;
    providing the user with an option to examine shipment information using a second level of detail, wherein the second level of detail is more refined compared to the first level of detail;
        wherein the first level of detail provides information concerning a shipment load, and the second level of detail provides information pertaining to an individual product on the shipment load;
    allowing a user to select the first or second level of detail; and
    providing shipping information to the user corresponding to the selected level of detail.

3. The method of claim 1, wherein the information pertaining to an individual product on the shipment load comprises a description of the individual product.

4. The method of claim 1, wherein the information pertaining to an individual product on the shipment load comprises priority information.

5. The method of claim 1, wherein the information pertaining to an individual product on the shipment load comprises supplier information.

6. The method of claim 1, wherein the information pertaining to an individual product on the shipment load comprises an identification of the trailer currently carrying the individual product.

7. The method of claim 1, wherein the information pertaining to an individual product on the shipment load comprises a destination.

8. The method of claim 1, wherein the information pertaining to an individual product on the shipment load comprises a part number.

9. The method of claim 2, wherein the information pertaining to an individual product on the shipment load comprises a description of the individual product.

10. The method of claim 2, wherein the information pertaining to an individual product on the shipment load comprises priority information.

11. The method of claim 2, wherein the information pertaining to an individual product on the shipment load comprises supplier information.

12. The method of claim 2, wherein the information pertaining to an individual product on the shipment load comprises an identification of the trailer currently carrying the individual product.

13. The method of claim 2, wherein the information pertaining to an individual product on the shipment load comprises a destination.

14. The method of claim 2, wherein the information pertaining to an individual product on the shipment load comprises a part number.

* * * * *